(12) United States Patent
Chien et al.

(10) Patent No.: US 9,357,229 B2
(45) Date of Patent: May 31, 2016

(54) CODING MOTION VECTORS IN VIDEO CODING

(75) Inventors: Wei-Jung Chien, San Diego, CA (US); Marta Karczewicz, San Diego, CA (US); Peisong Chen, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1021 days.

(21) Appl. No.: 13/179,427

(22) Filed: Jul. 8, 2011

(65) Prior Publication Data

US 2012/0027089 A1 Feb. 2, 2012

Related U.S. Application Data

(60) Provisional application No. 61/368,529, filed on Jul. 28, 2010, provisional application No. 61/376,583, filed on Aug. 24, 2010, provisional application No. 61/379,303, filed on Sep. 1, 2010, provisional application No. 61/407,389, filed on Oct. 27, 2010, provisional application No. 61/414,668, filed on Nov. 17, 2010, provisional application No. 61/500,029, filed on Jun. 22, 2011.

(51) Int. Cl.
*H04N 19/52* (2014.01)
*H04N 19/517* (2014.01)
(Continued)

(52) U.S. Cl.
CPC .......... *H04N 19/577* (2014.11); *H04N 19/109* (2014.11); *H04N 19/114* (2014.11); *H04N 19/115* (2014.11); *H04N 19/159* (2014.11); *H04N 19/162* (2014.11); *H04N 19/174* (2014.11); *H04N 19/176* (2014.11); *H04N 19/177* (2014.11); *H04N 19/196* (2014.11); *H04N 19/46* (2014.11); *H04N 19/463* (2014.11);

(Continued)

(58) Field of Classification Search
None
See application file for complete search history.

(56) References Cited

U.S. PATENT DOCUMENTS

| 6,072,831 A | 6/2000 | Chen |
| 7,599,438 B2 | 10/2009 | Holcomb et al. |

(Continued)

FOREIGN PATENT DOCUMENTS

| CN | 1694502 A | 11/2005 |
| CN | 101356822 A | 1/2009 |

(Continued)

OTHER PUBLICATIONS

ITU-T Recommendation H.264, "Advanced video coding for generic audiovisual services" (May 2003 edition).*

(Continued)

*Primary Examiner* — David N Werner
(74) *Attorney, Agent, or Firm* — Shumaker & Sieffert, P.A.

(57) ABSTRACT

This disclosure relates to techniques for reducing a cost of coding prediction information in video coding. Video blocks in a generalized P/B (GPB) frame are encoded using up to two motion vectors calculated from reference pictures in two separate reference picture lists that are identical. Video blocks of a GPB frame may, therefore, be encoded using a bidirectional prediction mode with a first motion vector from a reference picture in a first reference picture list and a second motion vector from the same or substantially similar reference picture in a second reference picture list. The techniques include jointly coding the first and second motion vectors for a video block of a GPB frame. The techniques include coding the first motion vector relative to a first motion predictor generated from a motion vector of a neighboring block, and coding the second motion vector relative to the first motion vector.

34 Claims, 9 Drawing Sheets

(51) Int. Cl.

| | |
|---|---|
| H04N 19/513 | (2014.01) |
| H04N 19/577 | (2014.01) |
| H04N 19/58 | (2014.01) |
| H04N 19/61 | (2014.01) |
| H04N 19/159 | (2014.01) |
| H04N 19/176 | (2014.01) |
| H04N 19/70 | (2014.01) |
| H04N 19/46 | (2014.01) |
| H04N 19/196 | (2014.01) |
| H04N 19/115 | (2014.01) |
| H04N 19/109 | (2014.01) |
| H04N 19/114 | (2014.01) |
| H04N 19/463 | (2014.01) |
| H04N 19/91 | (2014.01) |
| H04N 19/162 | (2014.01) |
| H04N 19/177 | (2014.01) |
| H04N 19/174 | (2014.01) |
| H04N 19/573 | (2014.01) |

(52) U.S. Cl.
CPC ............. *H04N 19/52* (2014.11); *H04N 19/573* (2014.11); *H04N 19/61* (2014.11); *H04N 19/70* (2014.11); *H04N 19/91* (2014.11)

(56) References Cited

U.S. PATENT DOCUMENTS

| | | | |
|---|---|---|---|
| 7,733,959 | B2 | 6/2010 | Chiou et al. |
| 7,852,916 | B2 | 12/2010 | Duvivier |
| 2002/0118758 | A1 | 8/2002 | Sekiguchi et al. |
| 2004/0252768 | A1 | 12/2004 | Suzuki et al. |
| 2005/0013498 | A1* | 1/2005 | Srinivasan ............. H04N 19/51 382/239 |
| 2005/0053141 | A1* | 3/2005 | Holcomb ............... H04N 19/70 375/240.16 |
| 2005/0053157 | A1* | 3/2005 | Lillevold .............. H04N 19/436 375/240.25 |
| 2005/0100093 | A1 | 5/2005 | Holcomb |
| 2005/0117646 | A1 | 6/2005 | Joch et al. |
| 2006/0083298 | A1 | 4/2006 | Wang et al. |
| 2006/0146143 | A1 | 7/2006 | Xin et al. |
| 2007/0064809 | A1 | 3/2007 | Watanabe et al. |
| 2007/0291131 | A1 | 12/2007 | Suzuki et al. |
| 2008/0137742 | A1 | 6/2008 | Chen et al. |
| 2008/0310506 | A1* | 12/2008 | Xu et al. ................ H04N 19/63 375/240.12 |
| 2009/0003445 | A1 | 1/2009 | Ying et al. |
| 2009/0067505 | A1 | 3/2009 | Tourapis et al. |
| 2009/0175334 | A1 | 7/2009 | Ye et al. |
| 2009/0310677 | A1 | 12/2009 | Shiodera et al. |
| 2009/0323813 | A1 | 12/2009 | Maciel de Faria et al. |
| 2010/0040139 | A1 | 2/2010 | Marpe et al. |
| 2010/0040148 | A1 | 2/2010 | Marpe et al. |
| 2010/0086029 | A1 | 4/2010 | Chen et al. |
| 2010/0091857 | A1 | 4/2010 | Lee |
| 2010/0150234 | A1 | 6/2010 | Koo et al. |
| 2010/0260262 | A1 | 10/2010 | Coban et al. |
| 2010/0296579 | A1 | 11/2010 | Panchal et al. |
| 2012/0121017 | A1 | 5/2012 | Chen et al. |
| 2012/0250765 | A1 | 10/2012 | Wu et al. |
| 2012/0250766 | A1 | 10/2012 | Wu et al. |
| 2013/0107959 | A1 | 5/2013 | Park et al. |
| 2013/0272404 | A1 | 10/2013 | Park et al. |

FOREIGN PATENT DOCUMENTS

| | | |
|---|---|---|
| CN | 101379835 A | 3/2009 |
| CN | 101449585 A | 6/2009 |
| CN | 101548550 A | 9/2009 |
| CN | 101778286 A | 7/2010 |
| EP | 1377067 A1 | 1/2004 |
| EP | 1806930 A1 | 7/2007 |
| KR | 20060069838 A | 6/2006 |
| KR | 20100067129 A | 6/2010 |
| TW | 200803517 A | 1/2008 |
| TW | 2010028010 A | 7/2010 |
| WO | WO2004030369 A1 | 4/2004 |
| WO | WO2004080078 A1 | 9/2004 |
| WO | 2009049250 A2 | 4/2009 |
| WO | 2009114054 A1 | 9/2009 |

OTHER PUBLICATIONS

Ono et al., "High Efficiency Moving Image Coding of Ubiquitous Technology MPEG-4 and H.264," 1st ed., Ohmsha Ltd., Apr. 20, 2005, pp. 103-105, ISBN: 4-274-20060-4, 13 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20 2012, JCTVC-J1003_d7, 261 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "High Efficiency Video Coding (HEVC) text specification draft 10," 12th Meeting: Geneva, CH, Jan. 14-23, 2013, JCTVC-L1003_v34, 310 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Reply to written opinion dated Jan. 31, 2012, from international application No. PCT/US2011/044730, filed May 23, 2012, 23 pp.

Reply to written opinion dated Jul. 9, 2012, from international application No. PCT/US2011/044730, filed Sep. 7, 2012, 25 pp.

International Preliminary Report on Patentability from international application No. PCT/US2011/044730, dated Oct. 25, 2012, 30 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Chien et al., "Modified Uni-directional Inter Prediction in Generalized P and B Picture," document JCTVC-C285, WG11 No. m18328, 3rd Meeting: Guangzhou, CN, Oct. 7-15, 2010, 2 pp.

Flierl et al., "Generalized B Pictures and the Draft H.264/AVC Video Compression Standard," IEEE Transactions on Circuits and Systems for Video Technology, vol. 13. No. 7, Jul. 2003, 12 pp.

Siu et al., "On Transcoding a B-Frame to a P-Frame in the Compressed Domain," IEEE Transactions on Multimedia, vol. 9, No. 6, Oct. 2007, 10 pp.

"Test Model under Consideration," document JCTVC-A205, 1st meeting: Dresden, DE, Apr. 15-23, 2010, 30 pp.

International Search Report and Written Opinion—PCT/US2011/044730—ISA/EPO—Jan. 31, 2012.

JCT-VC: "Test Model under Consideration (TMuC)", 1. JCT-VC Meeting; Apr. 15, 2010-Apr. 23, 2010; Dresden; (Jointcollaborative Team on Video Coding of ISO/IEC JTCI/SC29/WG11 and ITU-TSG.16); URL: http://wftp3.itu.int/av-arch/jctvc-site/,,No. JCTVC-A205, Jul. 18, 2010, XP030007586, ISSN: 0000-0049.

Li B et al: "Redundancy reduction in B-frame coding at temporal level zero", 3. JCT-VC Meeting; 94. MPEG Meeting; Oct. 7, 2010-

(56) References Cited

OTHER PUBLICATIONS

Oct. 15, 2010; Guangzhou; (Joint Collaborative Team on Video Coding of ISO/IECJTCI/SC29/WG11 and ITU-T SG. 16), No. JCTVC-C278, Oct. 2, 2010, XP030007985, ISSN: 0000-0019.
Samsung/BBC ED—Samsung/BBC: TEncGOP.cppN, Test Model Under Consideration for HEVC Internet Citation, Apr. 22, 2010, XP002664837, Retrieved from the Internet: URL: http://hevc.kw.bbc.co.uk/git/w/jctvc-hm/jctvc-hm-tsm.git/blob/3d7201db6989c276d091367c4e6447794a012900:/source/Lib/TLibEncoder/TEncGOP.cpp [retrieved on Nov. 30, 2011].
Bao et al., "A Low-Complexity AVC-based Scalable Video Codec," ITU-T Document VCEG-Y 13, Nov. 22-24, 2004, 15 pp.
U.S. Appl. No. 13/179,400, by Wei-Jung Chien, filed Jul. 8, 2011.
Anonymous, "Test Model under Consideration (draft007)", International Organisation for Standarisation, Apr. 2010, 152 pp.
Chen et al., "Comments on Generalized P and B Pictures", Joint Collaborative Team on Video Coding, Document: JCTVC-D401, Jan. 20-28, 2011, 4 pp.
Leontaris et al., "Weighted prediction methods for improved motion compensation", IEEE International Conference on Image Processing, Nov. 2009, 4 pp.
Written Opinion of the International Preliminary Examining Authority, PCT/US2011/044730, IPEA/EPO, Jul. 9, 2012, 10 pp.
Yin et al., "Unification of Motion Vector Prediction Methods", Joint Video Team, JVT-EO61r1, Oct. 9-17, 2002, 12 pp.
Zheng et al., "Extended Motion Vector Prediction for Bi predictive Mode", Joint Collaborative Team on Video Coding, Document: JCTVC-E343, Mar. 16-23, 2011, 4 pp.
Non-Final Office Action from U.S. Appl. No. 13/179,400 dated Jan. 3, 2014 (19 pages).
Amendment from U.S. Appl. No. 13/179,400 filed Apr. 3, 2014 (21 pages).
Final Office Action from U.S. Appl. No. 13/179,400 dated Jul. 15, 2014 (15 pages).
Amendment from U.S. Appl. No. 13/179,400 filed Sep. 15, 2014 (19 pages).
RCE and Amendment from U.S. Appl. No. 13/179,400 filed Oct. 15, 2014 (22 pages).
Co-pending U.S. Appl. No. 61/368,529, filed Jul. 28, 2010.
Co-pending U.S. Appl. No. 61/376,583, filed Aug, 24, 2010.
Richardson I.E.G., "H.264 and MPEG-4 Video Compression", John Wiley & Sons Ltd., 2003 (306 pages).
Ono et al., "Ubiquitous Technology, High-Efficiency Coding of Moving Images—MPEG-4 and H.264-," Ohmsha Ltd., 1st ed., Apr. 20, 2005, pp. 101-120, ISBN: 4-274-20060-4.
ITU-T H.265, Series H: Audiovisual and Multimedia Systems, Infrastructure of audiovisual services—Coding of moving video, High efficiency video coding, The International Telecommunication Union, Apr. 2013, 317 pages.
"ITU-T H.265, Series H: Audiovisual and Multimedia Systems, Infrastructure of audiovisual services—Coding of moving video, High efficiency video coding, The International Telecommunication Union, Oct. 2014, 540 pp.".
U.S. Office Action from U.S. Appl. No. 13/179,400 dated May 22, 2015 (14 pages).
Samsung/BBC, Initial Import as per submitted JCTVC-A124, "TDecTop.cpp", Apr. 22, 2010, Retrieved from [http://hevc.kw.bbc.co.uk/git/w/jctvc-hm/jctvc-hm-tsm.git/blob/3d7201db6989c276d091367c4e6447794a012900:/source/Lib/TLibDecoderr/TDecTop.cpp], 5 pp.

* cited by examiner

CODING MOTION VECTORS IN VIDEO CODING

This application claims the benefit of U.S. Provisional Application No. 61/368,529, filed Jul. 28, 2010, U.S. Provisional Application No. 61/376,583, filed Aug. 24, 2010, U.S. Provisional Application No. 61/379,303, filed Sep. 1, 2010, U.S. Provisional Application No. 61/407,389, filed Oct. 27, 2010, and U.S. Provisional Application No. 61/414,668, filed Nov. 17, 2010, each of which is hereby incorporated by reference in its respective entirety. This application also claims the benefit of U.S. Provisional Application No. 61/500,029, filed Jun. 22, 2011.

CROSS-REFERENCE TO RELATED APPLICATIONS

This application is related to the following co-pending U.S. patent application: "CODING MOTION PREDICTION DIRECTION IN VIDEO CODING" by Chien et al., U.S. application Ser. No. 13/179,400, filed Jul. 8, 2011, and expressly incorporated by reference herein.

TECHNICAL FIELD

This disclosure relates to video coding and, more particularly, video inter-coding techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks or coding units (CUs). Video blocks in an intra-coded (I) frame or slice are encoded using spatial prediction with respect to neighboring blocks. Video blocks in an inter-coded (P or B) frame or slice may use spatial prediction with respect to neighboring blocks in the same frame or slice or temporal prediction with respect to other reference pictures. Video blocks in a bidirectional predicted (B) frame are encoded using bidirectional prediction to calculate two motion vectors from two different reference picture lists, traditionally one list of past pictures and one list of future pictures. Video blocks in a unidirectional predicted (P) frame are encoded using unidirectional prediction to calculate a single motion vector from a single reference picture list, traditionally a list of past pictures.

SUMMARY

In general, this disclosure relates to techniques for reducing a cost of coding prediction information in video coding. A video block of an inter-coded video frame may be coded using either a unidirectional prediction mode with a motion vector from a reference picture in one of a first reference picture list and a second reference picture list, or a bidirectional prediction mode with a first motion vector from a reference picture in the first reference picture list and a second motion vector from a reference picture in the second reference picture list. In the emerging HEVC standard, a generalized P/B (GPB) frame is introduced that may be a special case of a bidirectional predicted (B) frame concept. Video blocks in a GPB frame are encoded using up to two motion vectors calculated from reference pictures in two separate reference picture lists that are identical. One or more video blocks of a GPB frame may, therefore, be encoded using the bidirectional prediction mode with two motion vectors from either the same reference picture or substantially similar reference pictures. A reference picture list may be alternatively referred to as a reference frame list.

The techniques of this disclosure include jointly coding the first and second motion vectors for a video block of a GPB frame. One or more syntax elements indicating motion vector information for the coded video block may be signaled to a video decoder. The techniques include coding the first motion vector relative to a first motion predictor generated from a motion vector of a neighboring block, and coding the second motion vector relative to the first motion vector. In this way, the second motion vector may be coded as the difference between the first motion vector and the second motion vector. The techniques may, therefore, reduce bits used to signal motion vector information by reducing or eliminating the syntax elements conventionally used to represent the second motion vector.

In one example, the disclosure is directed toward a method of coding video data comprising storing a first reference picture list and a second reference picture list, wherein the first and second reference picture lists are identical, coding a video block of a video frame designated as a generalized P/B (GPB) frame using bidirectional prediction with a first motion vector from a reference picture in the first reference picture list and a second motion vector from a reference picture in the second reference picture list, and jointly coding the first motion vector and the second motion vector for the video block.

In another example, the disclosure is directed toward a video coding device comprising a memory that stores a first reference picture list and a second reference picture list, wherein the first and second reference picture lists are identical, and a processor that codes a video block of a video frame designated as a generalized P/B (GPB) frame using a bidirectional prediction mode with a first motion vector from a reference picture in the first reference picture list and a second motion vector from a reference picture in the second reference picture list, and jointly codes the first motion vector and the second motion vector for the video block.

In a further example, the disclosure is directed toward a video coding device comprising means for storing a first reference picture list and a second reference picture list, wherein the first and second reference picture lists are identical, means for coding a video block of a video frame designated as a generalized P/B (GPB) frame using a bidirectional prediction mode with a first motion vector from a reference picture in the first reference picture list and a second motion vector from a reference picture in the second reference picture list, and means for jointly coding the first motion vector and the second motion vector for the video block.

In another example, the disclosure is directed toward a computer-readable storage medium comprising instructions for coding video data that, upon execution in a processor, cause the processor to store a first reference picture list and a second reference picture list, wherein the first and second reference picture lists are identical, code a video block of a video frame designated as a generalized P/B (GPB) frame using bidirectional prediction with a first motion vector from the first reference picture list and a second motion vector from the second reference picture list, and jointly code the first motion vector and the second motion vector for the video block.

The details of one or more examples are set forth in the accompanying drawings and the description below. Other features, objects, and advantages will be apparent from the description and drawings, and from the claims.

DETAILED DESCRIPTION

This disclosure relates to techniques for reducing a cost of coding prediction information in video coding. A video block of an inter-coded frame may be coded using either a unidirectional prediction mode with a single motion vector with respect to a reference picture in one of a first reference picture list and a second reference picture list, or a bidirectional prediction mode with a first motion vector with respect to a reference pictures in the first reference picture list and a second motion vector with respect to a reference picture in the second reference picture list. In certain examples, this disclosure relates specifically to cases in which a generalized P/B (GPB) frame is enabled such that the first and second reference picture lists are identical. In general, a reference picture list may be alternatively referred to as a reference frame list.

The techniques of this disclosure include reducing bits to signal one or more syntax elements indicating a motion prediction direction for a video block. When one of the reference picture lists is preferred over the other reference picture list, it may be more efficient to, by default, use the preferred reference picture list for the unidirectional prediction mode. This is especially true when a GPB frame is enabled. In that case, either of the two identical reference picture lists may be used for the unidirectional prediction mode. The techniques of this disclosure include coding one or more syntax elements indicating that the video block is coded using one of the unidirectional prediction mode with respect to a reference picture in a reference picture list and the bidirectional prediction mode using less than two bits.

The techniques of this disclosure also include reducing bits to signal motion vector information for a video block encoded using the bidirectional prediction mode. One or more blocks of a GPB frame may be encoded using the bidirectional prediction mode with two motion vectors from either the same reference picture or substantially similar reference pictures. The techniques of this disclosure may include jointly coding the first and second motion vectors for a video block of a GPB frame.

Figure 1:
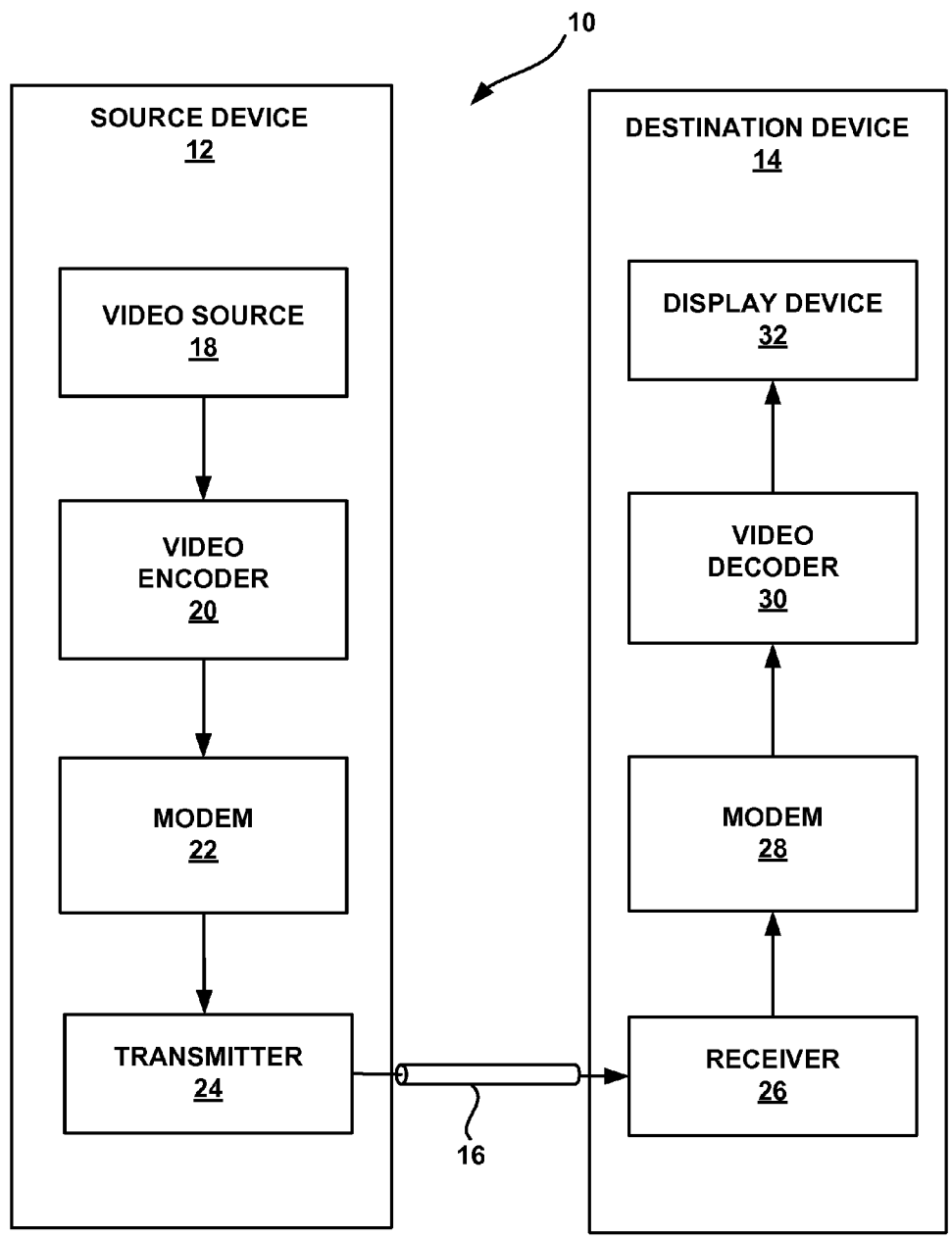
FIG. 1 is a block diagram illustrating an example video encoding and decoding system that may utilize techniques for efficiently coding prediction information for video blocks of a video frame.

FIG. 1 is a block diagram illustrating an example video encoding and decoding system 10 that may utilize techniques for efficiently coding prediction information for video blocks of a video frame. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices that can communicate video information over a communication channel 16, in which case communication channel 16 is wireless.

The techniques of this disclosure, however, which concern efficient coding prediction information for video blocks, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data, and devices 12, 14 may comprise any of a variety of wired or wireless media devices such as mobile telephones, smart phones, digital media players, set-top boxes, televisions, displays, desktop computers, portable computers, tablet computers, gaming consoles, portable gaming devices, or the like.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera, a video storage archive, a computer graphics source, or the like. Likewise, destination device 14 may interface with an external display device, rather than including an integrated display device.

The illustrated system 10 of FIG. 1 is merely one example. Techniques for efficient coding of prediction information for video blocks may be performed by any digital video encoding and/or decoding device. The techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

In accordance with this disclosure, video encoder 20 of source device 12 may be configured to apply the techniques for reducing a cost of coding prediction information for video blocks. For example, in the case of a unidirectional prediction mode, video encoder 20 may encode one or more syntax elements indicating that the video block is encoded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. A reference picture list may be alternatively referred to as a reference frame list. As another example, in the case of a bidirectional prediction mode, video encoder 20 may encode one or more video blocks of a GPB frame with two motion vectors from two identical reference picture lists, and jointly encode the two motion vectors for each of the video blocks. The two motion vectors may be from the same reference picture or substantially similar reference pictures.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of prediction units (PUs), coding units (CUs) or other units of coded video, e.g., video slices, video frames, and video sequences or groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with this disclosure, video decoder 30 of destination device 14 may be configured to apply the techniques for reducing a cost of coding prediction information for video blocks. For example, in the case of a unidirectional prediction mode, video decoder 30 may decode one or more syntax elements indicating that the video block is coded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. As another example, in the case of a bidirectional prediction mode, video decoder 30 may jointly decode two motion vectors for each of one or more video blocks of a GPB frame, and decode each of the video blocks with the two motion vectors from two identical reference picture lists. The two motion vectors may be from the same reference picture or substantially similar reference pictures.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-three intra-prediction encoding modes.

The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

A CU that is not further split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., list 0 or list 1) for the motion vector. Data for the CU defining the PU(s) may also describe, for example, partitioning of the CU into one or more PUs. Partitioning modes may differ between whether the CU is skip or direct mode encoded, intra-prediction mode encoded, or inter-prediction mode encoded.

A CU having one or more PUs may also include one or more transform units (TUs). Following prediction using a PU, a video encoder may calculate residual values for the portion of the CU corresponding to the PU. The residual values correspond to pixel difference values that may be transformed into transform coefficients quantized, and scanned to produce serialized transform coefficients for entropy coding. A TU is not necessarily limited to the size of a PU. Thus, TUs may be larger or smaller than corresponding PUs for the same CU. In some examples, the maximum size of a TU may be the size of the corresponding CU. This disclosure uses the term "video block" to refer to any of a CU, PU, or TU.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a coding unit (CU) or a partition unit (PU) of the CU. The video blocks may have fixed or varying sizes, and may differ in size according to a specified coding standard. Each video frame may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down", "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding to produce a PU for a CU, video encoder 20 may calculate residual data to produce one or more transform units (TUs) for the CU. PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of the unencoded picture and prediction values of a PU of a CU. Video encoder 20 may form one or more TUs including the residual data for the CU. Video encoder 20 may then transform the TUs.

Following any transforms to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

To perform CABAC, video encoder 20 may select a context model to apply to a certain context to encode symbols to be transmitted. The context may relate to, for example, whether neighboring symbols are non-zero or not. Video encoder 20 may then assign a value to represent the symbols by referring to probabilities assigned to the symbols based on the context. In some cases, a value may be a fractional bit, i.e., less than one bit. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on the context of the symbol.

Video encoder 20 may also entropy encode syntax elements for motion prediction directions and motion vector information produced when encoding video blocks. In accordance with the techniques of this disclosure, video encoder 20 may reduce a cost of coding prediction information for video blocks. For example, in the case of a unidirectional prediction mode, video encoder 20 may encode one or more syntax elements indicating that the video block is encoded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. As another example, in the case of a bidirectional prediction mode, video encoder 20 may encode one or more video blocks of a GPB frame with two motion vectors from two identical reference picture lists, and jointly encode the two motion vectors for each of the video blocks. The two motion vectors may be from the same reference picture or substantially similar reference pictures.

Video decoder 30 may operate in a manner essentially symmetrical to that of video encoder 20. For example, video decoder 30 may receive entropy encoded data representative of an encoded CU, including encoded PU and TU data. This received data may include syntax elements for motion prediction directions and motion vector information produced when encoding the video blocks. Video decoder 30 may also reduce a cost of coding prediction information for video blocks. For example, in the case of a unidirectional prediction mode, video decoder 30 may decode one or more syntax elements indicating that the video block is encoded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. As another example, in the case of a bidirectional prediction mode, video decoder 30 may jointly decode two motion vectors for each of one or more video blocks of a GPB frame, and decode each of the video blocks with the two motion vectors calculated from two identical reference picture lists. The two motion vectors may be calculated from the same reference picture or similar reference pictures.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
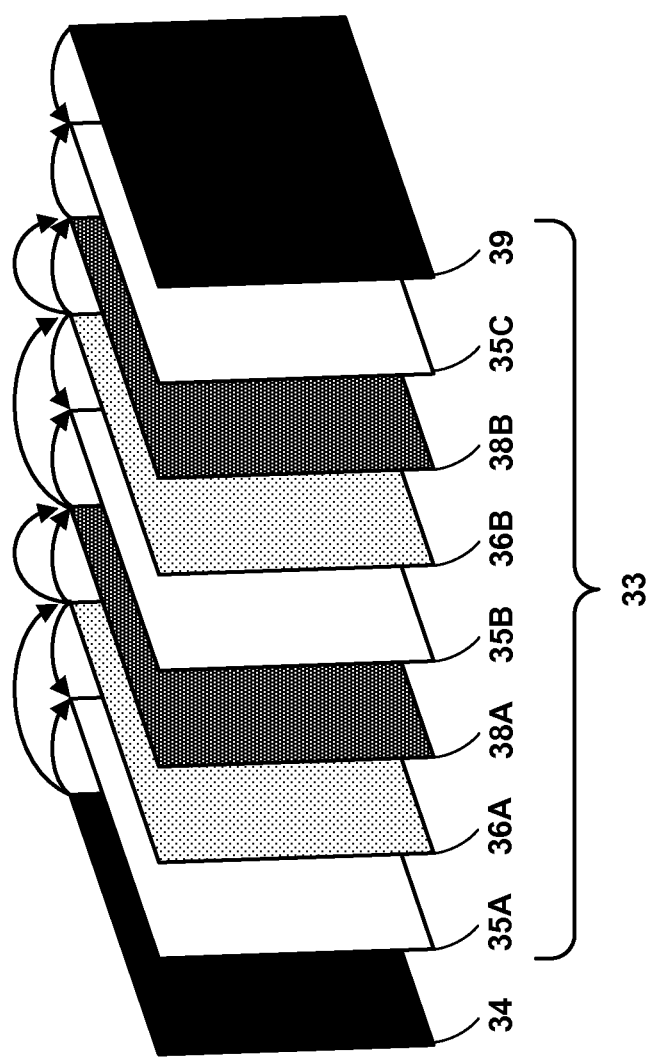
FIG. 2 is a conceptual diagram illustrating an example video sequence that includes GPB frames.

FIG. 2 is a conceptual diagram illustrating an example video sequence 33 that includes generalized P/B (GPB) frames 36A-36B and 38A-38B. In some cases, video sequence 33 may be referred to as a group of pictures (GOP). Video sequence 33, as illustrated, includes frames 35A, 36A, 38A, 35B, 36B, 38B, and 35C, and final frame 39 in display order. Frame 34 is a final frame in display order for a sequence occurring before sequence 33. FIG. 2 generally represents an exemplary prediction structure for a video sequence and is intended only to illustrate the frame references used for encoding different inter-mode frame types. An actual video sequence may contain more or fewer video frames of different frame types and in a different display order.

For block-based video coding, each of the video frames included in sequence 33 may be partitioned into video blocks or coding units (CUs). Each CU of a video frame may include one or more prediction units (PUs). Video blocks or PUs in an intra-coded (I) frame are encoded using spatial prediction with respect to neighboring blocks in the same frame. Video blocks or PUs in an inter-coded (P or B or GPB) frame may use spatial prediction with respect to neighboring blocks in the same frame or temporal prediction with respect to other reference pictures.

Video blocks in a B frame may be encoded using bidirectional prediction to calculate two motion vectors from two different reference picture lists, traditionally one past frame and one future frame. In some cases, video blocks in a B frame may be encoded using unidirectional prediction from one of the two different reference picture lists. Video blocks in a P frame may be encoded using unidirectional prediction to calculate a single motion vector from a single reference picture list, traditionally a past frame. In accordance with the emerging HEVC standard, video blocks in a GPB frame may be encoded using either unidirectional prediction to calculate a single motion vector from one of two identical reference picture lists or bidirectional prediction to calculate two motion vectors from the two identical reference picture lists. The two identical reference picture lists may contain past reference pictures.

In some cases, when a GPB frame is fully enabled for a given video slice, video frame, or video sequence, it may replace the standard P frame. In this case, all standard P frames may be treated as GPB frames such that a video encoder may determine to encode inter-mode frames as B frames or GPB frames. In other cases, when a GPB frame is partially enabled, all three inter-prediction modes may be used. In this case, a video encoder may determine to encode inter-mode frames as B frames, P frames or GPB frames.

In the example of FIG. 2, final frame 39 is designated for intra-mode coding as an I frame. In other examples, final frame 39 may be coded with inter-mode coding, e.g., as a P frame with reference to final frame 34 of the preceding sequence. Video frames 35A-35C (collectively "video frames 35") are designated for coding as B frames using bidirectional prediction with reference to a past frame and a future frame. In the illustrated example, frame 35A is encoded as a B frame with reference to final frame 34 and frame 36A, as indicated by the arrows from frame 34 and frame 36A to video frame 35A. Frames 35B and 35C are similarly encoded.

Video frames 36A-36B (collectively "video frames 36") may be designated for coding as either standard P frames or GPB frames using unidirectional prediction with reference to a past frame. In the illustrated example, frame 36A is encoded as a P frame or a GPB frame with reference to final frame 34, as indicated by the arrow from frame 34 to video frame 36A. Frame 36B is similarly encoded.

Video frames 38A-38B (collectively "video frames 38") may be designated for coding as GPB frames using bidirectional prediction with reference to the same past frame. In other examples, GPB frames may be encoded using bidirectional prediction with reference to substantially similar past frames included in the same reference picture list. In the illustrated example, frame 38A is encoded as a GPB frame with two references to frame 36A, as indicated by the two arrows from frame 36A to video frame 38A. Frame 38B is similarly encoded.

Figure 3:
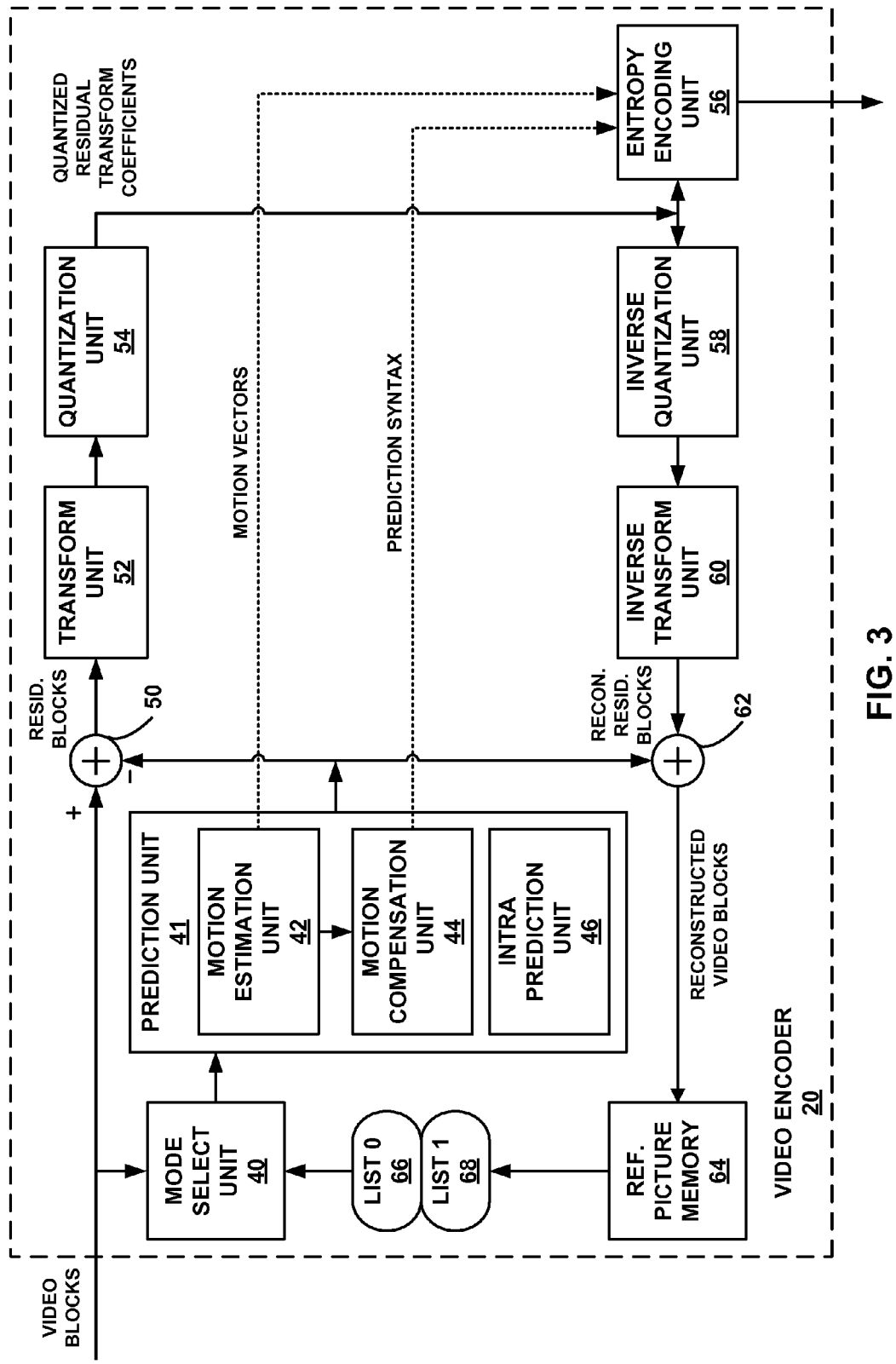
FIG. 3 is a block diagram illustrating an example video encoder that may implement techniques for efficiently coding prediction information for video blocks of a video frame.

FIG. 3 is a block diagram illustrating an example of video encoder 20 that may implement techniques for efficiently coding prediction information for video blocks of a video frame. Video encoder 20 may perform intra- and inter-coding of blocks within video frames, including CUs, or PUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I mode) may refer to any of several spatial based compression modes. Inter-modes such as unidirectional prediction (P mode), bidirectional prediction (B mode), or generalized PB prediction (GPB mode) may refer to any of several temporal-based compression modes.

As shown in FIG. 3, video encoder 20 receives a current video block within a video frame to be encoded. In the example of FIG. 3, video encoder 20 includes mode select unit 40, prediction unit 41, reference picture memory 64, summer 50, transform unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple CUs or video blocks. Mode select unit 40 may select one of the coding modes, intra or inter, for a current video block based on error results, and prediction unit 41 may provide the resulting intra- or inter-coded block to summer 50 to generate residual block data and to summer 62 to reconstruct the encoded block for use as a reference picture.

Intra prediction unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression. The one or more reference pictures may be selected from a first reference picture list (list 0) 66 and/or a second reference picture list (list 1) 68, which include identifiers for reference pictures stored in reference picture memory 64.

Motion estimation unit 42 may be configured to determine the inter-prediction mode for a video frame according to a predetermined pattern for a video sequence. The predetermined pattern may designate video frames in the sequence as P frames and/or B frames. In some cases, a GPB frame may be enabled such that one or more video frame may be designated as GPB frames. In other cases, when a GPB frame is enabled, motion estimation unit 42 may determine whether to encode originally designated P frames as GPB frames. The latter case may depend on whether the GPB frame is fully or partially enabled.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU or video block within a current video frame relative to a predictive block within a reference picture. A predictive block is a block that is found to closely match the portion of the CU including the PU to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU or video block of an inter-coded frame by comparing the PU to blocks of a reference picture identified in either list 0 66 or list 1 68. For example, when the inter-coded frame comprises a P frame, motion estimation unit 42 may use unidirectional prediction for a video block in the P frame and calculate a single motion vector from the one of list 0 66 and list 1 68 that includes identifiers for past frames, traditionally list 0 66.

When the inter-coded frame comprises a B frame, for example, list 0 66 and list 1 68 will include identifiers for different reference pictures, traditionally past pictures and future pictures. Motion estimation unit 42 may use bidirectional prediction for a video block of the B frame and calculate two motion vectors from list 0 66 and list 1 68. In some cases, motion estimation unit 42 may use unidirectional prediction for the video block of the B frame and calculate a single motion vector from one of reference picture lists 66, 68.

In accordance with the emerging HEVC standard, when the inter-coded frame comprises a GPB frame, list 0 66 and list 1 68 includes identifiers for identical reference pictures. More specifically, the number of pictures included in each of list 0 66 and list 1 68 are identical, and a picture indicated by each index entry in list 0 66 is identical to the picture indicated by the same index entry in list 1 68. The reference pictures included in list 0 66 and list 1 68 may comprise past pictures. In this case, motion estimation unit 42 may use bidirectional predication for a video block of the GPB frame and calculate two motion vectors from list 0 66 and list 1 68. Motion estimation unit 42 may also use unidirectional prediction for the video block of the GPB frame and calculate a single motion vector from one of the list 0 66 and list 1 68.

When one of the reference picture lists is preferred over the other reference picture list, it may be more efficient to, by default, use the preferred reference picture list for unidirectional prediction. This may be the case when unidirectional prediction for a B frame is most often performed based on one of the reference picture lists over the other. For example, unidirectional prediction for a B frame may typically be performed based on past reference pictures from list 0 66, similar to a P frame. In that example, motion compensation unit 44 may determine that list 0 66 is the preferred reference picture list. When the GPB frame is enabled such that list 0 66 and list 1 68 are identical, motion compensation unit 44 may use either one of list 0 66 and list 1 68 interchangeably for unidirectional prediction instead of selecting between the two identical reference picture lists.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. Video encoder 20 forms a residual video block by subtracting the predictive block from the current video block being coded. Summer 50 represents the component or components that perform this subtraction operation.

Motion compensation unit 44 may calculate prediction information for a PU of a current CU by retrieving the predictive block identified by the motion vector for the PU. The prediction information may include, for example, a motion prediction direction, motion vector information including motion predictors, and reference picture list information. Motion compensation unit 44 may also generate syntax elements defined to represent the prediction information calculated for a current video block or PU. Video encoder 20 may then encode the syntax elements indicating the prediction information and signal the syntax elements to video decoder 30.

In accordance with the techniques of this disclosure, video encoder 20 may reduce a cost of coding prediction information for video blocks. For example, in the case of the unidirectional prediction mode, video encoder 20 may encode one or more syntax elements indicating that the video block is coded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. As another example, in case of the bidirectional prediction mode, video encoder 20 may encode one or more video blocks of a GPB frame with two motion vectors from two identical reference picture lists, and jointly encode the two motion vectors for each of the video blocks. The two motion vectors may be from the same reference picture or substantially similar reference pictures.

The techniques for reducing a cost of coding prediction information for video blocks in the case of unidirectional prediction will be described first. Motion compensation unit 44 may generate syntax elements for a motion prediction direction for a current video block. A conventional syntax element, inter_pred_idc, for a motion prediction direction of a video block in a B frame includes a first bit to indicate whether unidirectional prediction or bidirectional prediction is used to encode the block, and a second bit to indicate the reference picture list used for unidirectional prediction. In the case of identical reference picture lists, the second bit of the conventional syntax element may be redundant as either of the reference picture lists may be used interchangeably for the unidirectional prediction mode.

According to the techniques of this disclosure, motion compensation unit 44 may generate a single bit syntax element for the motion prediction direction by eliminating an indication of the reference picture list used for the unidirectional prediction mode. Video encoder 20 then encodes and signals the single bit syntax for the motion prediction direction along with the motion vector information for each video block of the current video frame to video decoder 30 at the video block or PU level.

When the current video frame is designated as a GPB frame, video encoder 20 stores list 0 66 and list 1 68 that contain identifiers for identical reference pictures stored in reference picture memory 64. Since list 0 66 and list 1 68 include identical reference pictures, motion compensation unit 44 may use either of the two identical reference picture lists interchangeably for the unidirectional prediction mode. Video encoder 20 encodes one or more video blocks of the GPB frame using the unidirectional prediction mode with respect to a reference picture in one of the reference picture lists.

Motion compensation unit 44 may generate single bit syntax to represent the motion prediction direction for video blocks of the GPB frame encoded using the unidirectional prediction mode. Video encoder 20 may also signal a GPB frame flag to video decoder 30 to indicate that the current video frame is encoded as a GPB frame. The GPB frame flag may be used to explicitly inform video decoder 30 that a given video frame within a sequence is encoded as a GPB frame such that the motion prediction directions of the video blocks are encoded with a single bit syntax. The explicit signaling may enable video decoder 30 to parse the single bit syntax to determine the motion prediction direction. In some cases, video encoder 20 may not explicitly signal the GPB frame flag, but implicitly signal that a given frame is encoded as a GPB frame when the reference picture lists are identical. The GPB frame flag is described in more detail below.

In one example, a separate syntax may be defined for a GPB frame that comprises a single bit syntax element, e.g., bi_pred_flag, defined to indicate whether the video block of the GPB frame is encoded using the unidirectional prediction mode or the bidirectional prediction mode. Introduction of the single-bit syntax element may avoid confusion with the conventional syntax element, i.e., inter_pred_idc, described above. Motion compensation unit 44 may generate the single bit syntax element to represent the motion prediction direction for each of the video blocks of the GPB frame. Video encoder 20 then encodes the single bit syntax element for one or more of the video blocks of the GPB frame to indicate that the video block is encoded using one of the unidirectional prediction mode and the bidirectional prediction mode. It is not necessary to explicitly signal which of the reference picture lists 66, 68 is used to encode the video blocks of the GPB frame, because either of the identical reference picture lists may be used for unidirectional prediction.

In another example, a single bit mode of the conventional syntax element, i.e., inter_pred_idc, may be defined for a GPB frame in which only the first bit of the syntax element is used to indicate whether the video block of the GPB frame is encoded using the unidirectional prediction mode or the bidirectional prediction mode. Motion compensation unit 44 may generate only the first bit of the conventional syntax element to represent the motion prediction direction for each of the video blocks of the GPB frame. Video encoder 20 then encodes only the first bit of the syntax element for one or more of the video blocks of the GPB frame to indicate that the video block is encoded using unidirectional prediction. Motion compensation unit 44 may eliminate the second bit of the syntax element for video blocks of the GPB frame, because either of the reference picture lists may be used for unidirectional prediction.

Table 1, presented below, provides initial results with the single bit mode of the conventional syntax element, i.e., inter_pred_idc, for the motion prediction direction in which only the first bit is encoded to indicate unidirectional prediction for video blocks of a GPB frame. Table 1 presents bit-depth rate reduction percentages, due to reduced bit syntax to represent motion prediction direction for video blocks of a GPB frame, for several video test sequences within Version 0.7 of the HM in the low-delay, high efficiency configuration. The average bit-depth rate reduction due to the reduced bit syntax element is 0.88%.

TABLE 1

Bit-depth rate reduction [%] due to reduced bit syntax to represent motion prediction direction for video blocks of a GPB frame

| Low-delay high-efficiency configuration | Bit-depth rate |
| --- | --- |
| WQVGA30_RaceHorses | −1.03 |
| WQVGA50_BasketballPass | −0.98 |
| WQVGA50_BlowingBubbles | −0.87 |
| WQVGA60_BQSquare | −0.92 |
| WQVGA AVE | −0.95 |
| WVGA30_RaceHorses | −0.60 |
| WVGA50_BasketballDrill | −0.58 |
| WVGA50_PartyScene | −0.65 |
| WVGA60_BQMall | −1.40 |
| WVGA AVE | −0.81 |
| 720p60_Vidyo1 | −1.55 |
| 720p60_Vidyo3 | −1.30 |
| 720p60_Vidyo4 | −1.22 |
| 720p AVE | −1.36 |
| 1080p24_ParkScene | −0.77 |
| 1080p24_Kimono | −0.51 |
| 1080p50_BasketballDrive | −0.52 |
| 1080p50_Cactus | −0.75 |
| 1080p60_BQTerrace | −0.47 |
| 1080p AVE | −0.60 |
| Average | −0.88 |

In some cases, video encoder 20 may assign a reduced bit value to represent the syntax elements indicating the motion prediction direction for video blocks of any type of inter-coded frame encoded using the unidirectional prediction mode from a reference picture list. As described above, when the video frame is designated as a B frame, the reference picture list may be a preferred one of the two different reference picture lists used most often for unidirectional prediction. When the video frame is designated as a GPB frame, the reference picture list may be either of the two identical reference picture lists.

For example, motion compensation unit 44 may adapt a binarization applied to the syntax elements indicating the motion prediction direction to represent the unidirectional prediction mode with respect to a reference picture in the preferred reference picture list with a single-bit binarization. Entropy encoding unit 56 may binarize each syntax element into a bit or a sequence of binary bits. Conventionally, for the syntax elements indicating the motion prediction direction, a binarization of 0 represents the bidirectional prediction mode, a binarization of 10 represents the unidirectional prediction mode with respect to a reference picture in list 0, and a binarization of 11 represents the unidirectional prediction mode with respect to a reference picture in list 1.

Motion compensation unit 44, however, may adaptively link the syntax elements with different binarizations such that the single bit binarization of 0 is linked to the syntax elements indicating the unidirectional prediction mode with respect to a reference picture in the preferred reference picture list. Motion compensation unit 44 may adapt the binarization based on how often each status of the syntax elements indicating the motion prediction direction occurs. When the unidirectional prediction mode with respect to a reference picture in a preferred reference picture list is used more often than the other prediction modes, it may be more efficient to link the single bit binarization of 0 to the unidirectional prediction mode with respect to the reference picture in the preferred reference picture list. For example, motion compensation unit 44 may adapt the binarization such that the single bit binarization of 0 represents the unidirectional prediction mode with respect to the reference picture in the preferred reference picture list, a binarization of 10 represents the unidirectional prediction mode with respect to a reference picture in the non-preferred reference picture list, and a binarization of 11 represents the bidirectional prediction mode.

Motion compensation unit 44 may generate the syntax elements to represent the motion prediction direction for each of the video blocks of the current frame. Video encoder 20 then assigns the single bit binarization to the syntax elements for one or more of the video blocks to indicate that the video block is encoded using the unidirectional prediction mode with respect to the reference picture in the preferred reference picture list. Video encoder 20 may signal the adaptive binarization of the syntax elements indicating the motion prediction direction to video decoder 30 at one of the video block or PU level, the CU level, the video slice level, the video frame level, or the video sequence level. This signaling may enable video decoder 30 to similarly adapt its binarization for the syntax elements indicating the motion prediction direction. In some cases, video decoder 30 may adaptively binarize the syntax elements independently based on how often each status of the syntax elements indicating the motion prediction directions occurs.

As another example, motion compensation unit 44 may refer to configuration data that biases a probability that the syntax elements indicate the preferred reference picture list to be higher than a probability that the syntax elements indicate the non-preferred reference picture list. For example, the configuration data may bias the probability initialization of the second bit of the conventional syntax element, i.e., inter_pred_idc, for the motion prediction direction toward the preferred reference picture list. Entropy encoding unit 56 estimates the probability of each bit of a syntax element being 1 or 0 for a current video block based context determined from the syntax values for neighboring video blocks in the same frame. For each context, a state machine tracks the past values and provides a current state as the best estimate of the probability of the syntax element for the current video block. For example, if the state values range from 0 to 128, a state value 0 could mean that the probability of the bit being 0 is 0.9999, and the state value 128 could mean that the probability of the bit being 0 is 0.0001. Entropy encoding unit 56 may encode syntax elements using values assigned based on the probability determination. Higher probability results in shorter values used to represent the syntax elements. In some cases, a value may be a fractional bit, i.e., less than one bit.

When one of the reference picture lists is preferred over the other reference picture list for unidirectional prediction, configuration data may increase the probability that the syntax elements indicate the preferred reference picture list in the case of the unidirectional prediction mode. For example, motion compensation unit 44 may set the state value for the second bit of the conventional syntax element to 0 based on configuration data such that the probability of the bit being 0, i.e., indicating the preferred reference picture list, is 0.9999.

Motion compensation unit 44 may generate the syntax elements indicating the motion prediction direction for each of the video blocks of the current frame. Video encoder 20 may assign a single bit value to the first bit of the syntax element for one or more of the video blocks to indicate that the video block is encoded using the unidirectional prediction. Video encoder 20 may then assign a fractional bit value, i.e., less than one bit, to the second bit of the syntax element for one or more of the video blocks to indicate that the preferred reference picture list is used for the unidirectional prediction mode. The higher probability that the second bit of the syntax element indicates the preferred reference picture list enables video encoder 20 to assign the fractional bit value to the second bit.

In addition to the modified syntax for the motion prediction direction, described above, the techniques of this disclosure may also include signaling flags to video decoder 30 to explicitly indicate when GPB frames are used and/or when the reduced bit syntax is used for the motion prediction direction. For example, if a GPB frame is enabled or allowed for the current video frame, video encoder 20 may signal a GPB enable flag to video decoder 30 to indicate that the GPB frame is enabled. Video encoder 20 may signal the GPB enable flag in syntax at either the video frame level or the video sequence level. The GPB enable flag may be defined to indicate that the GPB frame is disabled, fully enabled, or partially enabled. When the GPB frame is disabled, originally designated P frames are encoded as conventional P frames with one motion vector for each PU. When the GPB frame is fully enabled, originally designated P frames may be treated as GPB frames with one or two motion vectors for each PU. When the GPB frame is partially enabled, the P frame, B frame, and GPB frame concepts may be treated as distinct concepts.

Although the GPB frame is enabled, a new slice type may not be defined for the GPB frame such that GPB frames may be encoded as B slices and/or P slices. In this case, video encoder 20 may need to send an additional explicit or implicit indication to video decoder 30 to differentiate between standard B and/or P frames and GPB frames. The additional indication may also be used to notify video decoder 30 when the reduced bit syntax is used to represent motion prediction directions.

For example, all GPB frames may be coded as B slices with either different reference picture lists, in the case of conventional B frames, or identical reference picture lists, in the case of GPB frames. This mode of encoding GPB frames may be preferable when the GPB frame is fully enabled such that all inter-predictive frames may be encoded as B slices with or without identical reference picture lists.

In some cases, video encoder 20 may explicitly signal a GPB frame flag, e.g., gpb_pred_flag or slice_gpb_flag, to video decoder 30 to indicate when a video frame is encoded as a GPB frame in order to distinguish between a conventional B frame and a GPB frame. Video encoder 20 may signal the GPB frame flag in the syntax at one of the video slice level, the video frame level, or the video sequence level. In some cases, however, video encoder 20 may not explicitly signal the GPB frame encoding. In those cases, video encoder 20 may implicitly inform video decoder 30 that a given frame is encoded as a GPB frame when the reference picture lists are identical.

The slice header syntax for the GPB frame coded as a B slice may define a reduced bit syntax element for motion prediction direction. In one example, the reduced bit syntax element may be a mode of the conventional syntax element for motion prediction direction of B frames, i.e., inter_pred_idc, in which only the first bit of the syntax element is used. In another example, the reduced bit syntax element may be a newly defined single-bit syntax element, e.g., bi_pred_flag, described in more detail below.

An excerpt from the syntax at the video block or PU level is presented below in Table 2 with modifications to define one example of a reduced bit syntax element for motion prediction direction of a GPB frame coded as a B slice.

TABLE 2

| prediction_unit( x0, y0, currPredUnitSize ) { | C | Descriptor |
|---|---|---|
| . . . | | |
| if( slice_type == B && !isGPBSliceFlag) | | |
|    inter_pred_idc[ i ] | 2 | ue(v) \| ae(v) |
| if( slice_type == B && isGPBSliceFlag) | | |
|    inter_pred_idc[ i ] | 1 | u(1) \| ae(v) |
| . . . | | |

The predition_unit syntax is defined for a given PU located within a video frame at originating pixel or sub-pixel coordinates (x0, y0) and having a certain size given by currPredUnitSize. The C column in Table 2 indicates a category for each syntax element that defines in which data partition of the current video block the syntax element is included. The Descriptor column in Table 2 indicates a type of coding used for the syntax element to enable proper parsing of the syntax element at video decoder 30. For example, the descriptor "ue(v)" indicates exponential-Golomb coding. As shown in the syntax excerpt in Table 2, if the video frame that includes the current video block or PU is considered a B slice but is not a GPB frame, then motion compensation unit 44 generates the conventional, two-bit syntax element, inter_pred_idc[i], to signal the motion prediction direction for partition i of the video block of the conventional B frame. If, however, the video frame is considered a B slice and is a GPB frame, then motion compensation unit 44 generates only a first bit of the conventional syntax element, inter_pred_idc[i], to signal the motion prediction direction for partition i of the video block of the GPB frame. The GPB flag variable, isGPBSliceFlag, used in the prediction unit syntax table may be determined to be true when video encoder 20 explicitly signals the GPB frame flag at a higher level to indicate that the video frame is encoded as a GPB frame, or when the reference picture lists are determined to be identical.

In another example, all GPB frames may be coded as P slices with the option of bidirectional prediction in the case of GPB frames. This mode of encoding GPB frames may be preferable when the GPB frame is partially enabled such that inter-predictive frames may be encoded as B slices or P slices with or without bidirectional prediction. In some cases, video encoder 20 may explicitly signal a GPB frame flag, e.g., gpb_pred_flag or slice_gpb_flag, to a video decoder, such as video decoder 30, to indicate when a video frame is encoded as a GPB frame in order to distinguish between a conventional P frame and a GPB frame. Video encoder 20 may signal the GPB frame flag in the syntax at one of the video slice level, the video frame level, or the video sequence level.

The slice header syntax for the GPB frame coded as a P slice may define a reduced bit syntax element for motion prediction direction. In one example, the reduced bit syntax element may be a newly defined single-bit syntax element, e.g., bi_pred_flag. The single-bit syntax element may be defined to indicate whether a video block is encoded using unidirectional prediction or bidirectional prediction. The single-bit syntax element may have a different name to avoid confusion with the conventional, two-bit syntax element for motion prediction directions of B frames. For example, the single-bit syntax element may be named "bi_pred_flag" instead of "inter_pred_idc." In another example, the reduced bit syntax element may be a mode of the conventional syntax element for motion prediction directions of B frames, i.e., inter_pred_idc, in which only the first bit of the syntax element is used.

An excerpt from the syntax at the video block or PU level is presented below in Table 3 with modifications to define one example of a reduced bit syntax element for motion prediction direction of a GPB frame coded as a P slice.

TABLE 3

| prediction_unit( x0, y0, currPredUnitSize ) { | C | Descriptor |
|---|---|---|
| ... | | |
| if( slice_type == B) | | |
|   inter_pred_idc[ i ] | 2 | ue(v) \| ae(v) |
| if( slice_type == P && slice_gpb_flag) | | |
|   bi_pred_flag[ i ] | 1 | u(1) \| ae(v) |
| ... | | |

The predition_unit syntax is defined for a given PU located within a video frame at originating pixel or sub-pixel coordinates (x0, y0) and having a certain size given by currPredUnitSize. The C column in Table 3 indicates a category for each syntax element that defines in which data partition of the current video block the syntax element is included. The Descriptor column in Table 3 indicates a type of coding used for the syntax element to enable proper parsing of the syntax element at video decoder 30. For example, the descriptor "ue(v)" indicates exponential-Golomb coding. As shown in the syntax excerpt in Table 3, if the video frame that includes the current video block or PU is considered a B slice, then motion compensation unit 44 generates the conventional, two-bit syntax element, inter_pred_[i], to signal the motion prediction direction for partition i of the video block of the conventional B frame. If, however, the video frame is considered a P slice and is a GPB frame, then motion compensation unit 44 generates the single-bit syntax element, bi_pred_flag[i], to signal the motion prediction direction for partition i of the video block of the GPB frame. The GPB flag, slice_gpb_flag, used in the syntax may be determined to be true when video encoder 20 explicitly signals the GPB frame flag at a higher level to indicate that the video frame is encoded as a GPB frame.

In some cases, when the GPB frame is enabled, a new slice type may be defined for the GPB frames. In this case, no additional explicit or implicit signaling is necessary to indicate that the current video frame is encoded as a GPB frame. The slice header syntax for the GPB frame coded as a GPB slice may define a reduced bit syntax element for motion prediction directions. In one example, the reduced bit syntax element may be the newly defined single-bit syntax element, e.g., bi_pred_flag, described above. In another example, the reduced bit syntax element may be a mode of the conventional syntax element for motion prediction directions of B frames, i.e., inter_pred_idc, in which only the first bit of the syntax element is used.

An excerpt from the syntax at the video block or PU level is presented in Table 4 below with modifications to define one example of a reduced bit syntax element for motion prediction direction of a GPB frame coded as a GPB slice.

TABLE 4

| prediction_unit( x0, y0, currPredUnitSize ) { | C | Descriptor |
|---|---|---|
| ... | | |
| if( slice_type == B) | | |
|   inter_pred_idc[ i ] | 2 | ue(v) \| ae(v) |
| if( slice_type == GPB) | | |

TABLE 4-continued

| prediction_unit( x0, y0, currPredUnitSize ) { | C | Descriptor |
|---|---|---|
|   bi_pred_flag[ i ] | 1 | u(1) \| ae(v) |
| ... | | |

The predition_unit syntax is defined for a given PU located within a video frame at originating pixel or sub-pixel coordinates (x0, y0) and having a certain size given by currPredUnitSize. The C column in Table 4 indicates a category for each syntax element that defines in which data partition of the current video block the syntax element is included. The Descriptor column in Table 4 indicates a type of coding used for the syntax element to enable proper parsing of the syntax element at video decoder 30. For example, the descriptor "ue(v)" indicates exponential-Golomb coding. As shown in the syntax excerpt, if the video frame that includes the current video block or PU is considered a B slice, then motion compensation unit 44 generates the conventional, two-bit syntax element, inter_pred_idc[i], to signal the motion prediction direction for partition i of the video block of the conventional B frame. If, however, the video frame is considered a GPB slice, then motion compensation unit 44 generates the single-bit syntax element, bi_pred_flag[i], to signal the motion prediction direction for partition i of the video block of the GPB frame.

The techniques for reducing a cost of coding prediction information for video blocks in the case of bidirectional prediction will now be described. As described above, motion estimation unit 42 may use bidirectional prediction to calculate a first motion vector from list 0 66 and a second motion vector from list 1 68 for a current video block of a GPB frame. Motion compensation unit 44 may then generate syntax elements defined to indicate the motion vectors for the current video block. Conventional syntax elements for motion vectors include a first syntax element, i.e., mvd, defined to indicate a difference between a motion vector and a motion predictor, and a second syntax element, i.e., ref_idx, defined to indicate an index in a reference picture list of a reference picture from which the motion predictor is generated.

When the current video frame is designated as a GPB frame, video encoder 20 stores list 0 66 and list 1 68 that contain identifiers for identical reference pictures. Since list 0 66 and list 1 68 include identical reference pictures, motion estimation unit 42 may calculate the first and second motion vectors from either the same reference picture or substantially similar reference pictures. The first and second motion vectors for a video block of the GPB frame are, therefore, highly correlated. Generating syntax elements independently for each of the highly correlated motion vectors may be redundant and it may be more efficient to jointly encode the two motion vectors.

According to the techniques of this disclosure, motion compensation unit 44 may reduce bits used to signal the motion vectors by reducing or eliminating the syntax elements conventionally used to represent the second motion vector. Video encoder 20 then jointly encodes the first and second motion vectors. For example, video encoder 20 may conventionally encode the first motion vector relative to a motion predictor, and then encode the second motion vector relative to the first motion vector. Video encoder 20 signals the jointly encoded motion vectors along with other prediction syntax for each video block of the GPB frame to video decoder 30 at the video block or PU level.

Motion compensation unit 44 receives the first and second motion vectors for a current video block of a GPB frame from motion estimation unit 42. Motion compensation unit 44 then generates a first motion predictor for the first motion vector from a motion vector of a neighboring video block. For example, the first motion vector for the current video block may point to a predictive block in a reference picture from list 0 66. The first motion predictor may, therefore, be generated from a motion vector of a neighboring video block in the GPB frame that points to another block in the same reference picture from list 0 66.

Motion compensation unit 44 generates the syntax elements to represent the first motion vector relative to the first motion predictor. For example, motion compensation unit 44 generates the first syntax element, i.e., mvd, defined to indicate a difference between the first motion vector and the first motion predictor, and the second syntax element, i.e., ref_idx, defined to indicate an index in list 0 66 of the reference picture from which the first motion predictor is generated. In this way, video encoder 20 may conventionally encode the first motion vector relative to the first motion predictor with the syntax elements generated by motion compensation unit 44.

Motion compensation unit 44 may not generate a second motion predictor for the second motion vector from a neighboring video block, but instead uses the first motion vector as the second motion predictor. Video encoder 20 then encodes the second motion vector for the video block relative to the first motion vector. In this way, the second motion vector may be encoded as the difference between the first motion vector and the second motion vector. In some examples, motion compensation unit 44 may not generate any syntax elements for the second motion vector. In other examples, motion compensation unit 44 may generate only the first syntax element defined to indicate a difference between the second motion vector and the first motion vector.

In some cases, video encoder 20 may only jointly encode the first and second motion vectors when the motion vectors point to the same reference picture or substantially similar reference pictures. When the first and second motion vectors do not point to the same reference picture, the first motion vector may be scaled according to a temporal distance between the first motion vector and the second motion vector before using the first motion vector as the second motion predictor.

In some examples, motion predictors for motion vectors of a current block may be generated from multiple motion vectors of neighboring blocks. In this case, motion compensation unit 44 may generate the first motion predictor for the first motion vector of the current video block from a plurality of candidate motion vectors of neighboring video blocks. Motion compensation unit 44 may also generate a second motion predictor for the second motion vector of the current video block from a plurality of candidate motion vectors that includes the first motion vector. In this case, the second motion vector may still be encoded relative to the first motion vector, but not exclusively based on the first motion vector.

A motion predictor for a motion vector from a given reference picture list is typically generated from a motion vector of a neighboring video block that is calculated from the same frame in the same reference picture list. When the current frame is a GPB frame, however, such that the first and second reference picture lists contain identifiers for identical reference pictures, the motion predictor may be generated from a different list than the motion vector of the neighboring video block. For example, if the motion vector of the neighboring video block points to a reference picture in list 0 66, motion compensation unit 44 may generate a first motion predictor for a motion vector of the current video block from the reference picture in either list 0 66 or list 1 68.

In some cases, a motion vector of a neighboring video block used to generate a first motion predictor may not be available in the same reference picture list, e.g., list 0 66, as the first motion vector of the current video block. According to the techniques of this disclosure, motion compensation unit 44 may calculate the first motion predictor from list 1 68 when the motion vector of the neighboring video block is not available in list 0 66. This may occur if the motion vector of the neighboring video block was originally calculated from list 1 68 and then not stored in list 0 66. As an additional solution, motion estimation unit 42 may store motion vectors calculated from each reference picture list in both reference picture list. For example, when motion estimation unit 42 calculates a motion vector from list 0 66 for a neighboring video block in a GPB frame, motion estimation unit 42 may store the motion vector in both list 0 66 and list 1 68. In this way, motion compensation unit 44 may always generate a motion predictor from the motion vector of the neighboring video block from either reference picture list 66, 68.

After motion compensation unit 44 generates the predictive block for the current video block based on the motion vectors and generates the syntax elements to represent prediction information for the current video block, video encoder 20 forms a residual video block by subtracting the predictive block from the current video block. Transform unit 52 may form one or more transform units (TUs) from the residual block. Transform unit 52 applies a transform, such as a discrete cosine transform (DCT) or a conceptually similar transform, to the TU, producing a video block comprising residual transform coefficients. The transform may convert the residual block from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval.

Entropy encoding unit 56 may also entropy encode the motion vectors and the other prediction syntax elements for the current video block being coded. For example, entropy encoding unit 56 may construct header information that includes appropriate syntax elements generated by motion compensation unit 44 for transmission in the encoded bitstream. At the PU or video block level, the syntax elements may include motion vectors and motion prediction direction. At higher levels, the syntax elements may include a GPB enabled flag that indicates whether a GPB frame is enabled for a given video frame, and a GPB encoded flag that indicates whether a given video frame is encoded as a GPB frame. A video decoder may use these syntax elements to retrieve the predictive blocks and reconstruct the original video blocks encoded by video encoder 20.

To entropy encode the syntax elements, entropy encoding unit 56 may binarize the syntax elements into one or more binary bits based on a context model. In this example, entropy encoding unit 56 may apply a binarization adapted by motion compensation unit 44 to link a single bit binarization to the syntax elements indicating the unidirectional prediction mode with respect to a reference picture in a preferred reference picture. Moreover, entropy encoding unit 56 may encode a bit of the syntax elements as a fractional bit value based on a probability initialization of the bit biased toward a preferred reference list.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within list 0 66 or list 1 68. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame.

Figure 4:
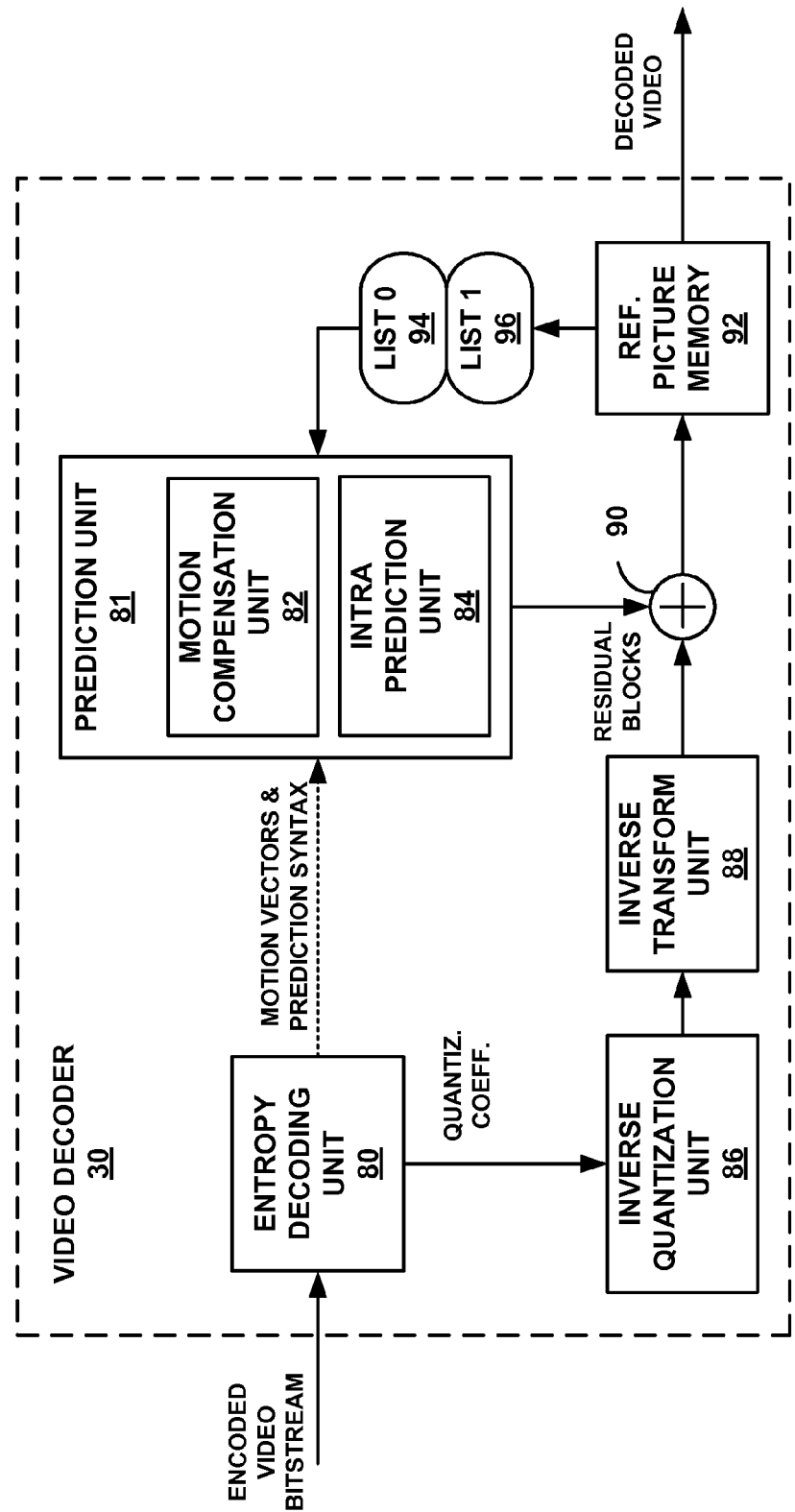
FIG. 4 is a block diagram illustrating an example video decoder that may implement techniques for efficiently coding prediction information for video blocks of a video frame.

FIG. 4 is a block diagram illustrating an example of video decoder 30 that may implement techniques for efficiently coding prediction information for video blocks of a video frame. In the example of FIG. 4, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 (FIG. 3).

During the decoding process, video decoder 30 receives an encoded video bitstream that includes an encoded video frame and syntax elements that represent coding information from a video encoder, such as video encoder 20. Entropy decoding unit 80 of video decoder 30 entropy decodes the bitstream to generate quantized coefficients, motion vectors, and other prediction syntax. Entropy decoding unit 80 forwards the motion vectors and other prediction syntax to prediction unit 81. Video decoder 30 may receive the syntax elements at the video block or PU level, the video slice level, the video frame level and/or the video sequence level.

Intra prediction unit 84 of prediction unit 81 may generate prediction data for a video block of the current video frame based on a signaled intra prediction mode and data from previously decoded blocks of the current frame. Motion compensation unit 82 of prediction unit 81 produces predictive blocks based on the motion vectors and prediction syntax received from entropy decoding unit 80. The predictive blocks may be produced from one or more of a first reference picture list (list 0) 94 and/or a second reference picture list (list 1) 96, which include identifiers for reference pictures stored in reference picture memory 92.

Motion compensation unit 82 may also perform interpolation based on interpolation filters. Motion compensation unit 82 may use interpolation filters as used by video encoder 20 during encoding of the video block to calculate interpolated values for sub-integer pixels of a reference block. Motion compensation unit 82 may determine the interpolation filters used by video encoder 20 from the received syntax elements and use the interpolation filters to produce predictive blocks.

Motion compensation unit 82 determines prediction information for the current video block by parsing the motion vectors and prediction syntax, and uses the prediction information to produce the predictive blocks for the current video block being decoded. Motion compensation unit 82 uses some of the received syntax elements to determine sizes of CUs used to encode the current frame, split information that describes how each CU of the frame is split, modes indicating how each split is encoded (e.g., intra- or inter-prediction), an inter-prediction slice type (e.g., B slice, P slice, or GPB slice), one or more reference picture lists for the frame, motion vectors for each inter-encoded PU or CU of the frame, motion prediction direction for each inter-encoded PU or CU of the frame, and other information to decode the current video frame.

Motion compensation unit 82 may parse the syntax at the video frame level or the video sequence level to determine whether a GPB frame is enabled or allowed for the current video frame. For example, motion compensation unit 82 may determine that a GPB frame is enabled based on a GPB enable flag received in the syntax at either the video frame level or the video sequence level. The GPB enable flag, described in more detail with respect to FIG. 3, may be defined to indicate that the GPB frame is disabled, fully enabled, or partially enabled. Motion compensation unit 82 may also parse the syntax at the video slice level or the video frame level to determine reference picture list information for the current video frame. Video decoder 30 then stores list 0 94 and list 1 96 that contain identifiers for reference pictures, as indicated by the syntax. When the current video frame is a GPB frame, list 0 94 and list 1 96 contain identifiers for identical reference pictures. More specifically, the number of pictures included in each of list 0 94 and list 1 96 are identical, and a picture indicated by each index entry in list 0 94 is identical to the picture indicated by the same index entry in list 1 96.

In accordance with the techniques of this disclosure, video decoder 30 may reduce a cost of coding prediction information for video blocks. For example, in the case of a unidirectional prediction mode, video decoder 30 may decode one or more syntax elements indicating that the video block is coded using one of the unidirectional prediction mode with respect to a reference picture in a reference picture list and the bidirectional prediction mode using less than two bits. The reference picture list may be a preferred one of two different reference picture lists or, when a GPB frame is enabled, either of two identical reference picture lists. As another example, in the case of a bidirectional prediction mode, video decoder 30 may jointly decode two motion vectors for each of one or more video blocks of a GPB frame, and decode each of the video blocks with the two motion vectors calculated from two identical reference picture lists. The two motion vectors may be calculated from the same reference picture or similar reference pictures.

The techniques for reducing a cost of coding prediction information for video blocks in the case of unidirectional prediction will be described first. Motion compensation unit 82 may parse one or more syntax elements for a motion prediction direction for the current video block. A conventional syntax element, inter_pred_idc, for a motion prediction direction of a video block in a B frame includes a first bit to indicate whether the unidirectional prediction mode or the bidirectional prediction mode is used to encode the block, and a second bit to indicate the reference picture list used for unidirectional prediction. In the case of identical reference picture lists, the second bit of the conventional syntax element may be redundant as either of the reference picture lists may be used interchangeable for the unidirectional prediction mode.

According to the techniques of this disclosure, motion compensation unit 82 may parse a reduced bit coding of the syntax elements indicating the motion prediction direction that indicates that the current video block is encoded using unidirectional prediction with respect to a reference picture in a reference picture list. When the current frame is determined to be a GPB frame, such that list 0 94 and list 1 96 are identical, motion compensation unit 82 may use either of the two identical reference picture lists interchangeably for the unidirectional prediction mode.

Motion compensation unit 82 may determine whether the current video frame is encoded as a GPB frame based on an explicitly signaled GPB frame flag, described with respect to FIG. 3. Motion compensation unit 82 may receive the GPB frame flag at either the video slice level, the video frame level, or the video sequence level. The GPB frame flag may be used to explicitly inform video decoder 30 that the current video frame is encoded as a GPB frame such that the motion prediction directions of the video blocks are encoded with a single bit syntax. The explicit signaling may enable video decoder 30 to correctly parse the single bit syntax element to determine the motion prediction direction regardless of when during the video sequence decoding starts. Based on the GPB frame flag, video decoder 30 may always be aware when the frame is a GPB frame and expect to parse a single bit syntax for the motion prediction directions.

In other cases, motion compensation unit 82 may compare list 0 94 and list 1 96, and determine that the current frame is a GPB frame when list 0 94 and list 1 96 contain identical reference pictures. The two reference picture lists, however, will only appear identical to video decoder 30 at the beginning of the video sequence before any reference pictures are added or updated during decoding. The implicit signaling, therefore, may only enable correct parsing of the single bit syntax element if video decoder 30 starts decoding at the beginning of the video sequence. Otherwise, video decoder 30 will not be aware that the frame is encoded as a GPB frame and will not expect to parse a single bit syntax for the motion prediction directions.

The explicit or implicit notification of GPB frame encoding may be necessary when the GPB frame is encoded as a B slice or a P slice. In other cases, motion compensation unit 82 may determine that the current frame is a GPB frame based on a new slice type defined for the GPB frame, which makes any additional explicit or implicit notification of GPB frame encoding unnecessary.

In one example, a separate syntax may be defined for a GPB frame that comprises a single bit syntax element, e.g., bi_pred_flag, defined to indicate whether the video block of the GPB frame is encoded using unidirectional prediction or bidirectional prediction. Introduction of the single bit syntax element may avoid confusion with the conventional syntax element, i.e., inter_pred_idc, described above. Motion compensation unit 82 may parse the single bit syntax element that indicates that the current video block of the GPB frame is coded using unidirectional prediction. Since either of the identical reference picture lists 94, 96 may be used for the unidirectional prediction mode, motion compensation unit 82 uses either of the reference picture lists for unidirectional prediction.

In another example, a single bit mode of the conventional syntax element, i.e., inter_pred_idc, may be defined for a GPB frame in which only the first bit of the syntax element is used to indicate whether the video block of the GPB frame is encoded using the unidirectional prediction mode or the bidirectional prediction mode. Motion compensation unit 82 may parse the syntax element for only the first bit of the syntax element that indicates that the video block is encoded using unidirectional prediction. Motion compensation unit 82 uses either of the reference picture lists for unidirectional prediction.

In some cases, motion compensation unit 82 may decode a reduced bit value assigned to the syntax elements indicating the motion prediction direction for video blocks of any type of inter-coded frame encoded using unidirectional prediction with respect to a reference picture in a reference picture list. When the video frame is designated as a B frame, the reference picture list may be a preferred one of the reference picture lists used most often for unidirectional prediction. When the video frame is designated as a GPB frame, the reference picture list may be either of the two identical reference picture lists.

As an example, motion compensation unit 82 may receive an adaptive binarization of the syntax elements indicating the motion prediction direction in the syntax from video encoder 20. Motion compensation unit 82 may receive the adaptive binarization at one of the video block or PU level, the CU level, the video slice level, the video frame level, or the video sequence level.

According to the received adaptive binarization, motion compensation unit 82 may adaptively link each status of the syntax elements indicating the motion prediction directions with different binarizations such that a single bit binarization is linked to the unidirectional prediction mode with respect to a reference picture in the preferred reference picture list. For example, motion compensation unit 82 may adapt the binarization such that the single bit binarization of 0 represents the unidirectional prediction mode with respect to the reference picture in the preferred reference picture list, a binarization of 10 represents the unidirectional prediction mode with respect to a reference picture in the non-preferred reference picture list, and a binarization of 11 represents the bidirectional prediction mode. In some cases, motion compensation unit 82 may adaptively binarize the syntax elements for the motion prediction direction independently based on how often each status of the syntax elements indicating the motion prediction directions occurs. Based on the adaptive binarization, motion compensation unit 82 may decode the single bit binarization for the syntax elements defined to indicate that the current video block is encoded using the unidirectional prediction mode with respect to a reference picture in the preferred reference list.

As another example, motion compensation unit 82 may receive a value assigned to represent the conventional syntax element, i.e., inter_pred_idc, for the motion prediction direction of the current video block. Motion compensation unit 82 may decode a single bit value assigned to the first bit of the syntax element defined to indicate that the current video block is encoded using the unidirectional prediction mode. Motion compensation unit 82 may then decode a fractional bit value assigned to the second bit of the syntax element defined to indicate that the preferred reference picture list is used for the unidirectional prediction mode. The fractional bit value used to represent the second bit may be based on a probability initialization of the second bit biased toward the preferred reference picture list according to configuration data. Higher probability results in shorter length values used to represent the syntax elements. The high probability that the second bit indicates the preferred reference picture list enables the second bit to be represented by a fractional bit value, i.e., less than one bit.

The techniques for reducing a cost of coding prediction information for video blocks in the case of bidirectional prediction will now be described. Video decoder 30 decodes motion vectors for a current video frame from the syntax received from video encoder 20. Conventional syntax elements for motion vectors include a first syntax element, i.e., mvd, defined to indicate a difference between a motion vector and a motion predictor, and a second syntax element, i.e., ref_idx, defined to indicate an index in a reference picture list of a reference picture from which the motion predictor is generated. When the current video frame is designated as a GPB frame, such that list 0 94 and list 1 96 contain identifiers for identical reference pictures, the first and second motion vectors point to either the same reference picture or substantially similar reference pictures. The first and second motion vectors for a video block of the GPB frame are, therefore, highly correlated and may be jointly encoded.

According to an example of the techniques of this disclosure, video decoder 30 jointly decodes the first and second motion vectors for the current video block of the GPB frame based on the syntax elements. In this way, motion compensation unit 82 may reduce bits used to signal the motion vectors by reducing or eliminating the syntax elements conventionally used to individually decode the motion vectors.

The first motion vector may be decoded conventionally based on the first syntax element, i.e., mvd, that indicates a difference between the first motion vector and a first motion predictor, and the second syntax element, i.e., ref_idx, that indicates an index in list 0 94 of a reference picture from which the first motion predictor is generated. Motion compensation unit 82 generates a first motion predictor for the first motion vector of the current video block from a motion vector of a neighboring video block in the video frame identified by the second syntax element. In this way, video decoder 30 may decode the first motion vector for the video block relative to the first motion predictor based on the first syntax element.

The second motion vector may then be decoded relative to the first motion vector. Motion compensation unit 82 may not generate a second motion predictor for the second motion vector from a neighboring video block, but instead uses the first motion vector as the second motion predictor. In this way, video decoder 30 may decode the second motion vector based on the difference between the first motion vector and the second motion vector. In some examples, motion compensation unit 82 may not receive any syntax elements for the second motion vector. In other examples, motion compensation unit 82 may receive only the first syntax element defined to indicate a difference between the second motion vector and the first motion vector.

In some examples, motion predictors for motion vectors of a current block may be generated from multiple motion vectors of neighboring blocks. In this case, motion compensation unit 82 may generate the first motion predictor for the first motion vector of the current video block from a plurality of candidate motion vectors of neighboring video blocks. Motion compensation unit 82 may also generate a second motion predictor for the second motion vector of the current video block from a plurality of candidate motion vectors that includes the first motion vector. In this case, the second motion vector may still be decoded relative to the first motion vector, but not exclusively based on the first motion vector.

When the current frame is a GPB frame, such that the first and second reference picture lists contain identifiers for identical reference pictures, the motion predictor may be generated from a different list than the motion vector of the neighboring video block. For example, if the motion vector of the neighboring video block points to a reference picture in list 0 94, motion compensation unit 82 may generate a first motion predictor for a motion vector of the current video block from the reference picture in either list 0 94 or list 1 96. Since list 0 94 and list 1 96 include identical reference pictures in the same order, the index of the reference picture from which the motion predictor is generated, identified by the second syntax element for the motion vector, refers to the same reference picture in both reference picture lists 94, 96.

In some cases, a motion vector of a neighboring video block used to generate a first motion predictor may not be available in the same reference picture list, e.g., list 0 94, as the first motion vector of the current video block. According to the techniques of this disclosure, motion compensation unit 82 may calculate the first motion predictor from list 1 96 when the motion vector of the neighboring video block is not available in list 0 94. This may occur if the motion vector of the neighboring video block was originally decoded from list 1 96 and then not stored in list 0 94. As an additional solution, motion compensation unit 82 may store motion vectors decoded from each reference picture list in both reference picture list. For example, when motion compensation unit decodes a motion vector from list 0 94 for a neighboring video block in a GPB frame, motion compensation unit 82 may store the motion vector in both list 0 94 and list 1 96. In this way, motion compensation unit 82 may always generate a motion predictor from the motion vector of the neighboring video block from either reference picture list 94, 96.

Inverse quantization unit 86 inverse quantizes, i.e., de-quantizes, the quantized transform coefficients provided in the bitstream and decoded by entropy decoding unit 80. The inverse quantization process may include use of a quantization parameter $QP_Y$ calculated by video encoder 20 for each CU or video block to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and prediction syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks are then stored in reference picture memory 92, which provides reference blocks of reference pictures for subsequent motion compensation. Reference picture memory 92 also produces decoded video for presentation on a display device, such as display device 32 of FIG. 1.

Figure 5:
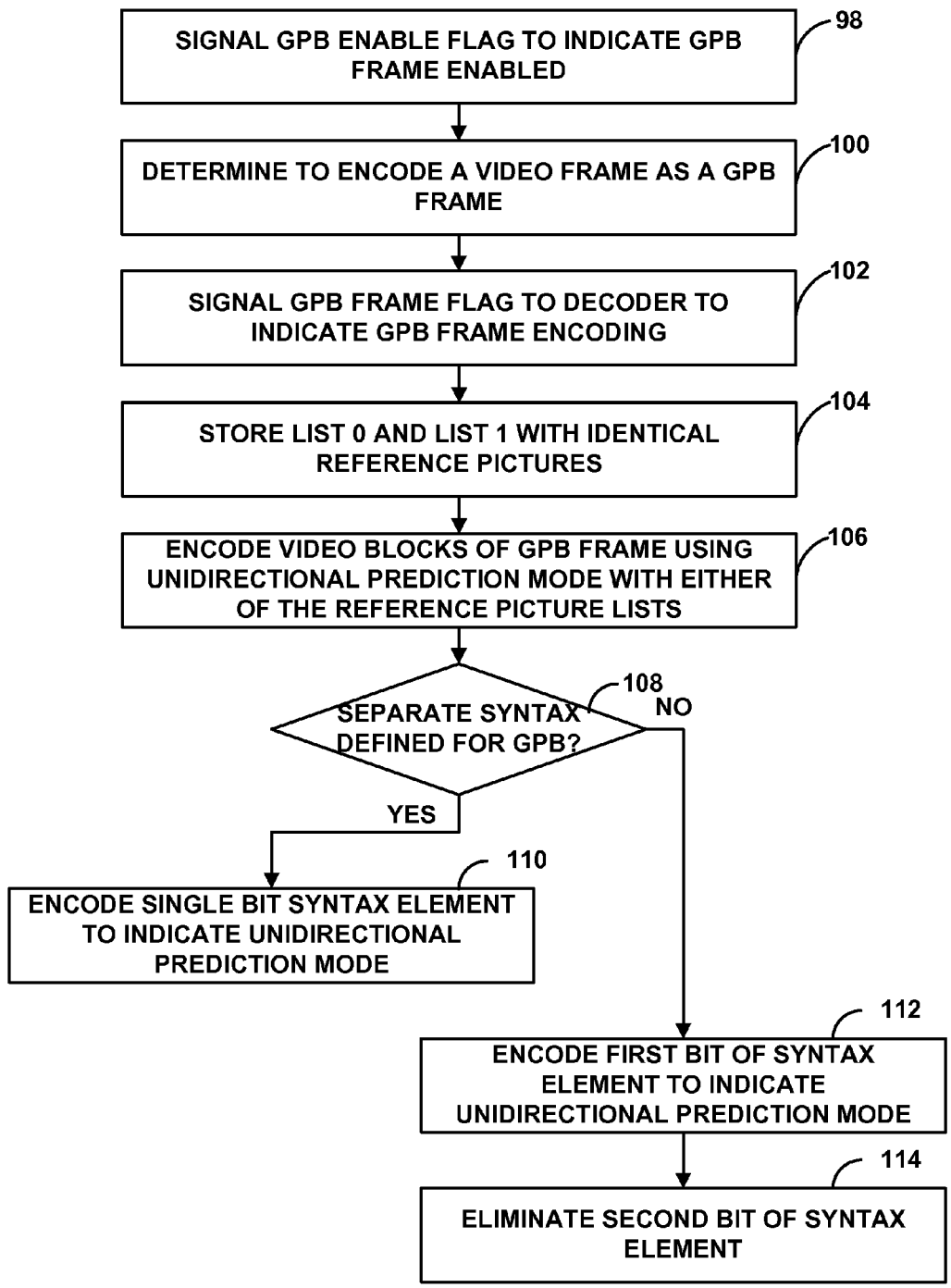
FIG. 5 is a flowchart illustrating an example operation of encoding a single bit syntax element indicating that a video block of a GPB frame is coded using a unidirectional prediction mode.

FIG. 5 is a flowchart illustrating an example operation of encoding a single bit syntax element indicating that a video block of a GPB frame is coded using the unidirectional prediction mode. The illustrated operation is described with reference to video encoder 20 from FIG. 3.

Video encoder 20 receives CUs or video blocks of a video frame to be encoded. If a GPB frame is enabled or allowed for the current video frame, video encoder 20 signals a GPB enable flag to a decoder, such as video decoder 30, to indicate that the GPB frame is enabled (98). Video encoder 20 may signal the GPB enable flag in the syntax at either the video frame level or the video sequence level. The GPB enable flag may be defined to indicate that the GPB frame is disabled, fully enabled, or partially enabled. When the GPB frame is fully enabled, originally designated P frames may be treated as GPB frames with one or two motion vectors for each block. When a GPB frame is partially enabled, the P frame, B frame, and GPB frame concepts may be treated as distinct concepts.

Video encoder 20 then determines to encode the current video frame as a GPB frame (100). In some cases, motion estimation unit 42 of video encoder 20 may be configured to determine the inter-prediction mode for a video frame according to a predetermined pattern for a video sequence. The predetermined pattern may designate one or more video frames in the sequence as GPB frames. In other cases, motion estimation unit 42 may determine whether to encode originally designated P frames as GPB frames. The latter case may depend on whether the GPB frame is fully or partially enabled.

Optionally, the video encoder 20 may signal a GPB frame flag to video decoder 30 to indicate that the current video frame is encoded as a GPB frame (102). Video encoder 20 may signal the GPB frame flag in the syntax at one of the video slice level, the video frame level, or the video sequence level. The GPB frame flag may be used to explicitly inform video decoder 30 that a given frame within a sequence is encoded as a GPB frame such that motion prediction directions are encoded with reduced bit syntax. In some cases, however, video encoder 20 may not explicitly signal the GPB frame encoding. In those cases, video encoder 20 may implicitly signal the video decoder 30 that a given frame is encoded as a GPB frame when the reference picture lists are identical. The explicit or implicit notification of GPB frame encoding may be necessary when the GPB frame is encoded as a B frame or a P frame. In other cases, a new frame or slice type may be defined for the GPB frame, which makes any additional explicit or implicit notification of GPB frame encoding unnecessary.

When the current video frame is determined to be encoded as a GPB frame, video encoder 20 stores a first reference picture list (list 0) 66 and a second reference picture list (list 1) 68 for the GPB frame that contain identifiers for identical reference pictures in a memory (104). Since list 0 66 and list 1 68 include identical reference pictures, motion compensation unit 44 of video encoder 20 may use either of the two identical reference picture lists interchangeably for unidirectional prediction.

Video encoder 20 encodes one or more video blocks of the GPB frame using unidirectional prediction with respect to a reference picture in either of the reference picture lists (106). According to the techniques of this disclosure, motion compensation unit 44 then generates a single bit syntax to represent the motion prediction direction for each of the video blocks encoded using unidirectional prediction. In some cases, a separate syntax may be defined for a GPB frame that comprises a single bit syntax element defined to indicate whether the video block is encoded using unidirectional prediction or bidirectional prediction (108). Introduction of the single bit syntax element may avoid confusion with the conventional syntax element that includes a first bit defined to indicate whether unidirectional prediction or bidirectional prediction is used to encode a block, and a second bit defined to indicate which reference picture list is used for unidirectional prediction.

When the separate syntax element is defined for the GPB frame (YES branch of 108), motion compensation unit 44 generates the single bit syntax element. Video encoder 20 encodes the single bit syntax element for each of the video blocks to indicate that the video block is encoded using unidirectional prediction (110). It is not necessary to explicitly signal which of the reference picture lists is used to encode the video blocks of the GPB frame, because either of the identical reference picture lists may be used for unidirectional prediction.

When the separate syntax element has not been defined for the GPB frame (NO branch of 108), motion compensation unit 44 may generate only the first bit of the conventional syntax element. Video encoder 20 encodes only the first bit of the syntax element for each of the video blocks to indicate that the video block is encoded using unidirectional prediction (112). Motion compensation unit 44 may eliminate the second bit of the syntax element for video blocks of the GPB frame, because either of the reference picture lists may be used for unidirectional prediction (114). In either case, video encoder 20 signals the single bit syntax for the motion prediction direction along with the motion vector information for each video block of the GPB frame to the video decoder at the block or PU level.

Figure 6:
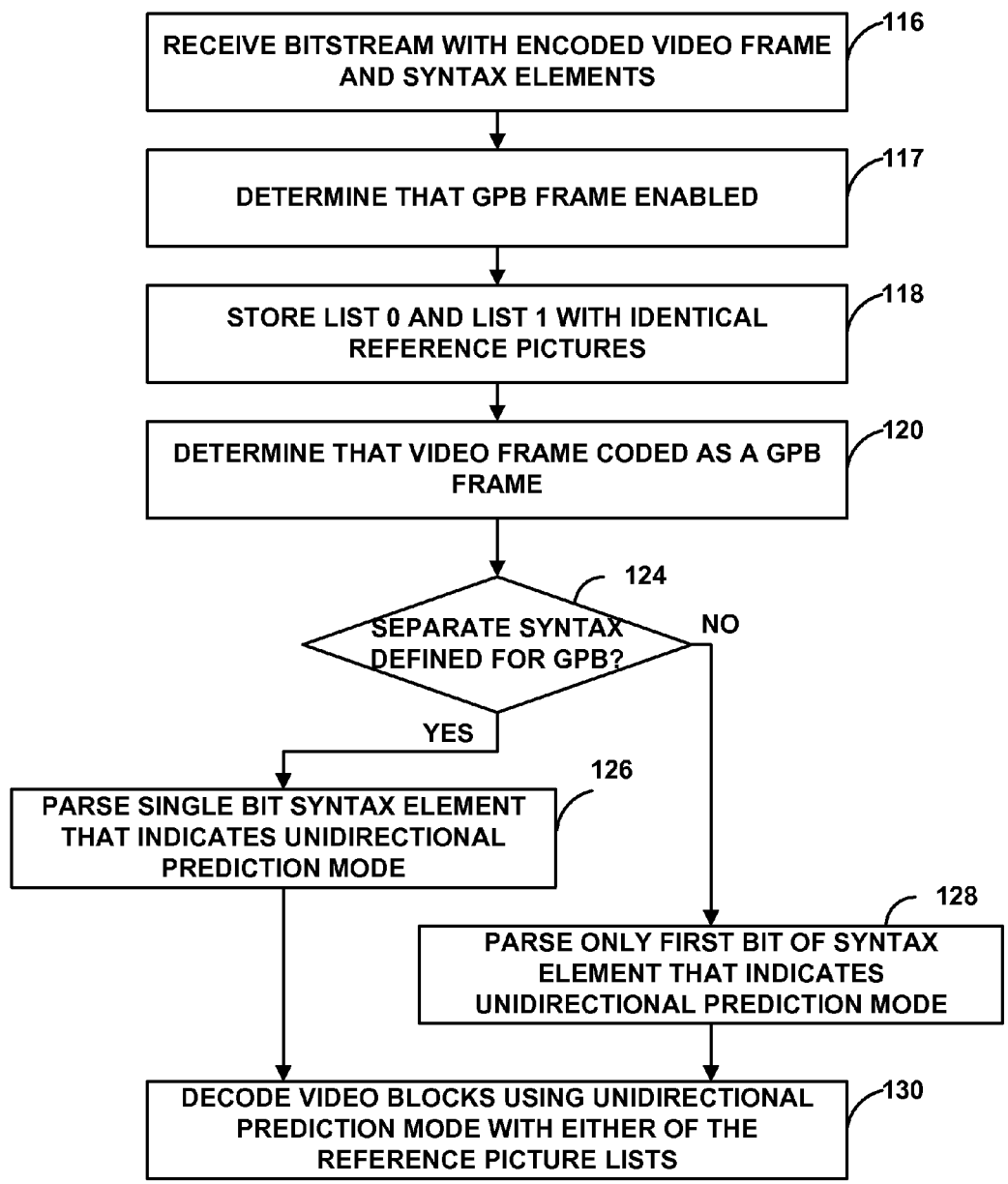
FIG. 6 is a flowchart illustrating an example operation of decoding a single bit syntax element indicating that a video block of a GPB frame is coded using a unidirectional prediction mode.

FIG. 6 is a flowchart illustrating an example operation of decoding a single bit syntax element indicating that a video block of a GPB frame is coded using the unidirectional prediction mode. The illustrated operation is described with reference to video decoder 30 from FIG. 4.

Video decoder 30 receives a bitstream including an encoded video frame and syntax elements that represent coding information from an corresponding video encoder, such as video encoder 20 (116). Video decoder 30 may receive syntax elements at the video block or PU level, the video slice level, the video frame level and/or the video sequence level. Entropy decoding unit 80 of video decoder 30 entropy decodes the bitstream to generate quantized coefficients, motion vectors, and other prediction syntax. Entropy decoding unit 80 forwards the motion vectors and other prediction syntax to motion compensation unit 82 of prediction unit 81. Motion compensation unit 82 then determines that a GPB frame is enabled or allowed for the current video frame (117). Motion compensation unit 82 may determine that the GPB frame is enabled based on a GPB enable flag received with the syntax at either the video frame level or the video sequence level. The GPB enable flag may be defined to indicate that the GPB frame is disabled, fully enabled, or partially enabled.

Video decoder 30 stores the first reference picture list (list 0) 94 and the second reference picture list (list 1) 96 that contain identifiers for identical reference pictures, as indicated in the syntax at the video frame level, in a memory (118). Motion compensation unit 82 then determines that the current video frame is encoded as a GPB frame (120). In some cases, motion compensation unit 82 may determine that a given frame is a GPB frame based on an explicitly signaled GPB frame flag received in the syntax at either the video slice level, the video frame level, or the video sequence level. In other cases, motion compensation unit 82 may determine that a given frame is a GPB frame when the first and second reference picture lists 94, 96 contain identical reference pictures. The explicit or implicit notification of GPB frame encoding may be necessary when the GPB frame is encoded as a B frame or a P frame. In additional cases, motion compensation unit 82 may determine that a given frame is a GPB frame based on a new frame or slice type defined for the GPB frame, which makes any additional explicit or implicit notification of GPB frame encoding unnecessary.

When the current frame is determined to be a GPB frame, motion compensation unit 82 becomes aware that the motion prediction direction for each video block in the BGP frame encoded using unidirectional prediction may be represented by a single bit syntax. Since list 0 94 and list 1 96 include identical reference pictures, motion compensation unit 82 may use either of the two identical reference picture lists interchangeably for unidirectional prediction.

In some cases, a separate syntax may be defined for a GPB frame that comprises a single bit syntax element defined to indicate whether the video block is encoded using unidirectional prediction or bidirectional prediction (124). Introduction of the single bit syntax element may avoid confusion with the conventional syntax element that includes a first bit to indicate whether unidirectional prediction or bidirectional prediction is used to encode a block, and a second bit to indicate which reference picture list is used for unidirectional prediction.

When the separate syntax element is defined for the GPB frame (YES branch of 124), motion compensation unit 82 parses the single bit syntax element that indicates that the video block is encoded using unidirectional prediction (126). Since either of the identical reference picture lists may be used for the unidirectional prediction mode, motion compensation unit 82 uses one of the reference pictures lists for unidirectional prediction. When the separate syntax element has not been defined for the GPB frame (NO branch of 122), motion compensation unit 82 parses the syntax element for only the first bit of the syntax element that indicates that the video block is encoded using unidirectional prediction (128). Motion compensation unit 82 uses either of the reference pictures lists for the unidirectional prediction mode. In either case, video decoder 30 then decodes one or more video blocks of the GPB frame using unidirectional prediction from the preferred reference picture list (130).

Figure 7:
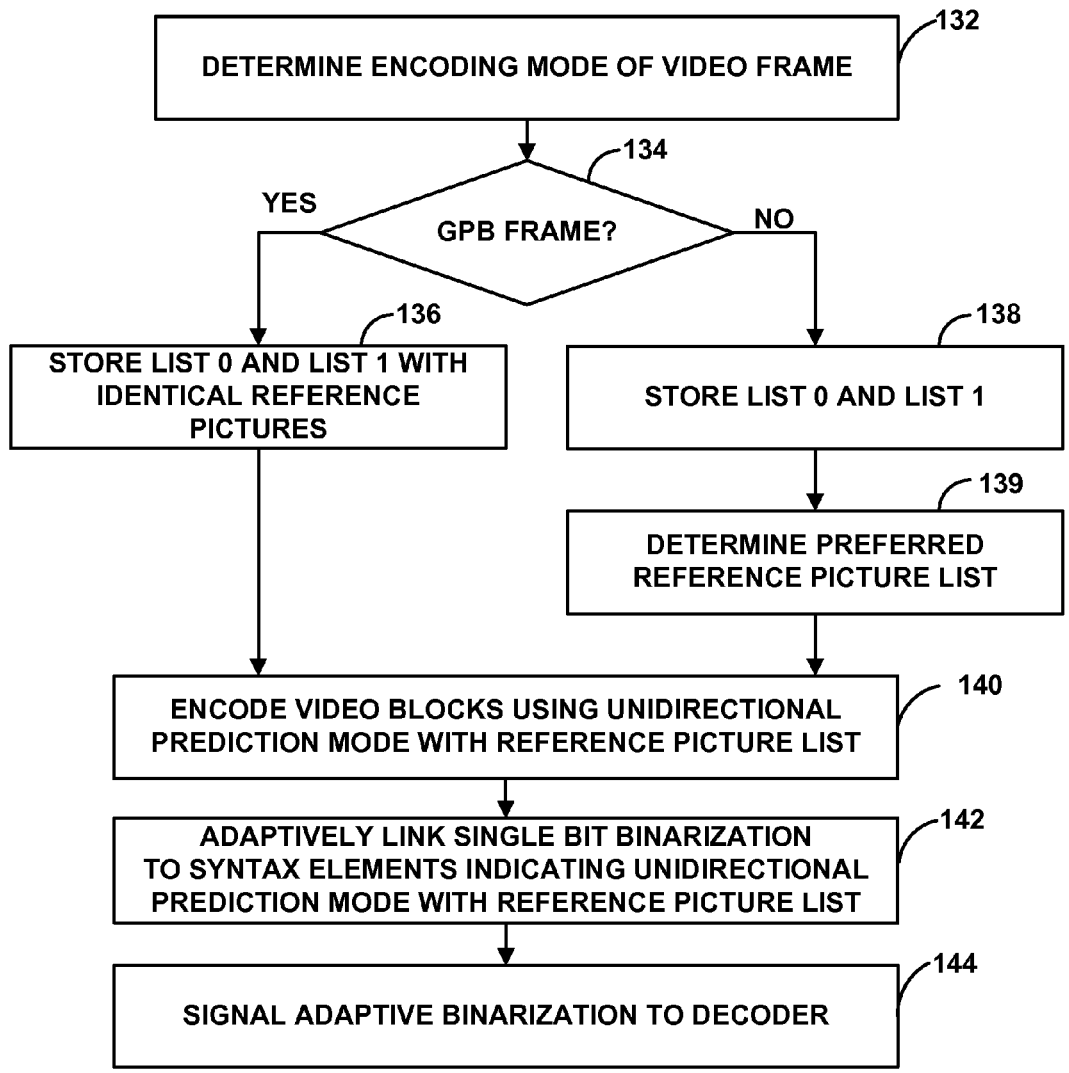
FIG. 7 is a flowchart illustrating an example operation of encoding one or more syntax elements indicating that a video block is coded using a unidirectional prediction mode with respect to a reference picture in a reference picture list using less than two bits.

FIG. 7 is a flowchart illustrating an example operation of encoding one or more syntax elements indicating that a video block is coded using the unidirectional prediction mode from a reference picture list using less than two bits. The illustrated operation is described with reference to video encoder 20 from FIG. 3.

Video encoder 20 receives CUs or video blocks of a video frame to be encoded. Video encoder 20 then determines the encoding mode of the current video frame (132). In some cases, motion estimation unit 42 of video encoder 20 may be configured to determine the inter-prediction mode for a video frame according to a predetermined pattern for a video sequence. The predetermined pattern may designate video frames in the sequence as P frames and/or B frames. In some cases, a GPB frame may be enabled such that one or more video frames may be designated as GPB frames, or motion estimation unit 42 may determine to encode originally designated P frames as GPB frames.

When the current video frame is determined to be encoded as a GPB frame (YES branch of 134), video encoder 20 stores a first reference picture list (list 0) 66 and a second reference picture list (list 1) 68 for the GPB frame that contain identifiers for identical reference pictures in a memory (136). Since list 0 66 and list 1 68 include identical reference pictures, motion compensation unit 44 of video encoder 20 may use either of the two identical reference picture lists as a preferred reference picture list for the unidirectional prediction mode.

When the current video frame is determined to be encoded as a P frame or a B frame (NO branch of 138), video encoder 20 stores a first reference picture list (list 0) 66 and a second reference picture list (list 1) 68 for the frame that contain identifiers for different reference pictures in a memory (138). Conventionally, list 0 66 contains identifiers for past reference pictures and list 1 68 contains identifiers for future reference pictures. In some cases, motion compensation unit 44 may determine which one of the two reference picture lists comprises a preferred reference picture list for unidirectional prediction (139). This may be the case when unidirectional prediction for a B frame is most often performed based on one of the reference picture lists over the other. For example, unidirectional prediction for a B frame may typically be performed based on past reference pictures from list 0 66, similar to a P frame. In that example, motion compensation unit 44 may determine that list 0 66 is the preferred reference picture list.

Video encoder 20 encodes one or more video blocks of the current video frame using the unidirectional prediction mode with respect to a reference picture in the preferred reference picture list (140). According to the techniques of this disclosure, motion compensation unit 44 then generates one or more syntax elements indicating the motion prediction direction for each of the video blocks. Video encoder 20 assigns a value to represent the syntax elements for the motion prediction direction. Video encoder 20 then signals the value assigned to the syntax elements for the motion prediction direction along with the motion vector information for each video block of the current video frame to the video decoder at the block or PU level.

In some cases, entropy encoding unit 56 may binarize each syntax element into a bit or a sequence of binary bits. The conventional syntax element for the motion prediction direction includes a first bit to indicate whether unidirectional prediction or bidirectional prediction is used to encode a block, and a second bit to indicate which reference picture list is used for unidirectional prediction. Conventionally, a binarization of 0 represents bidirectional prediction, a binarization of 10 represents unidirectional prediction from list 0, and a binarization of 11 represents unidirectional prediction from list 1.

In the illustrated example, motion compensation unit 44 may adaptively link a single bit binarization to the syntax elements indicating the unidirectional prediction mode with respect the preferred reference picture list (142). Motion compensation unit 44 may adapt the binarization based on how often each status of syntax elements indicating the motion prediction directions occurs. When unidirectional prediction from a preferred reference picture list is used more often than the other prediction modes, it may be more efficient to link a single bit binarization of 0 with the unidirectional prediction mode from a reference picture in the preferred reference picture list. For example, in the case where list 0 is the preferred reference picture list, motion compensation unit 44 may adapt the binarization such that a single-bit binarization of 0 represents the unidirectional prediction mode with respect to a reference picture in list 0, a binarization of 10 represents the unidirectional prediction mode with respect to a reference picture in list 1, and a binarization of 11 represents the bidirectional prediction mode.

Video encoder 20 may then signal the adaptive binarization of the syntax elements indicating the motion prediction direction to a corresponding video decoder, such as video decoder 30 (144). Motion compensation unit 44 may adapt and signal the binarization at one of the video block or PU level, the CU level, the video slice level, the video frame level, or the video sequence level.

Figure 8:
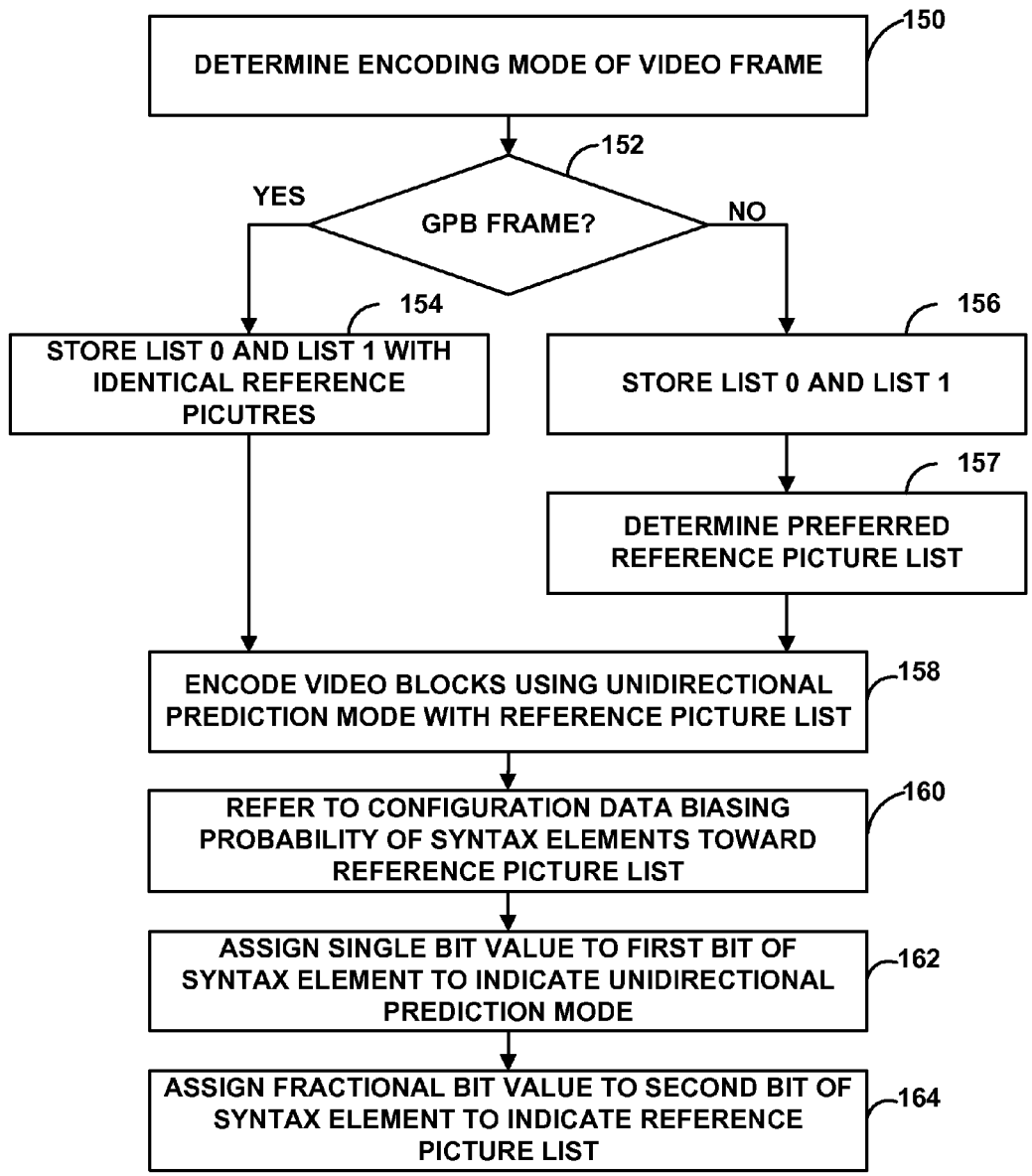
FIG. 8 is a flowchart illustrating another example operation of encoding one or more syntax elements indicating that a video block is coded using a unidirectional prediction mode with respect to a reference picture in a reference picture list using less than two bits.

FIG. 8 is a flowchart illustrating another example operation of encoding one or more syntax elements indicating that a video block is coded using the unidirectional prediction mode with respect to a reference picture in a reference picture list using less than two bits. The illustrated operation is described with reference to video encoder 20 from FIG. 3.

Video encoder 20 receives CUs or video blocks of a video frame to be encoded. Video encoder 20 then determines the encoding mode of the current video frame (150). In some cases, motion estimation unit 42 of video encoder 20 may be configured to determine the inter-prediction mode for a video frame according to a predetermined pattern for a video sequence. The predetermined pattern may designate video frames in the sequence as P frames and/or B frames. In some cases, a GPB frame may be enabled such that one or more video frame may be designated as GPB frames, or motion estimation unit 42 may determine to encode originally designated P frames as GPB frames.

When the current video frame is determined to be encoded as a GPB frame (YES branch of 152), video encoder 20 stores a first reference picture list (list 0) 66 and a second reference picture list (list 1) 68 for the GPB frame that contain identifiers for identical reference pictures in a memory (154). Since list 0 66 and list 1 68 include identical reference pictures, motion compensation unit 44 of video encoder 20 may use either of the two identical reference picture lists as a preferred reference picture list for the unidirectional prediction mode.

When the current video frame is determined to be encoded as a P frame or a B frame (NO branch of 152), video encoder 20 stores a first reference picture list (list 0) 66 and a second reference picture list (list 1) 68 for the frame that contain identifiers for different reference pictures in a memory (156). Conventionally, list 0 66 contains identifiers for past reference pictures and list 1 68 contains identifiers for future reference pictures. In some cases, motion compensation unit 44 may determine which one of the two reference picture lists comprises a preferred reference picture list for unidirectional prediction (157). This may be the case when unidirectional prediction for a B frame is most often performed based on one of the reference picture lists over the other. For example, unidirectional prediction for a B frame may typically be performed based on past reference pictures from list 0 66, similar to a P frame. In that example, motion compensation unit 44 may determine that list 0 66 is the preferred reference picture list.

Video encoder 20 encodes one or more video blocks of the current video frame using the unidirectional prediction mode with respect to a reference picture in the preferred reference picture list (158). According to the techniques of this disclosure, motion compensation unit 44 then generates one or more syntax elements indicating the motion prediction direction for each of the video blocks. Video encoder 20 assigns a value to represent the syntax elements for the motion prediction direction. Video encoder 20 then signals the value assigned to the syntax elements for the motion prediction direction along with the motion vector information for each video block of the current video frame to the video decoder at the block or PU level.

The conventional syntax element for the motion prediction direction includes a first bit to indicate whether unidirectional prediction or bidirectional prediction is used to encode a block, and a second bit to indicate which reference picture list is used for unidirectional prediction. For each bit, entropy encoding unit 56 estimates the probability of the bit being 1 or 0 based on the context. Higher probability results in shorter length the values used to encode the syntax elements. In some cases the value may comprise a fractional bit, i.e., less than one bit.

In the illustrated example, motion compensation unit 44 may refer to configuration data that biases the probability of the syntax elements toward the preferred reference picture list (160). When one of the reference picture lists is preferred over the other reference picture list for unidirectional prediction, it may be more efficient to increase the probability that the syntax elements indicate the preferred reference picture list in the case of the unidirectional prediction mode. For example, motion compensation unit 44 may set the state value for the second bit of the syntax element to 0 such that the probability of the bit being 0, i.e., indicating list 0, is 0.9999 according to the configuration data.

Video encoder 20 assigns a single bit value to the first bit of the syntax element for the motion prediction direction for each of the video blocks to indicate that the video block is encoded using the unidirectional prediction mode (162). Video encoder 20 then assigns a fractional bit value to the second bit of the syntax element for the motion prediction direction for each of the video blocks to indicate that the preferred reference picture list used for unidirectional prediction mode (164).

Figure 9:
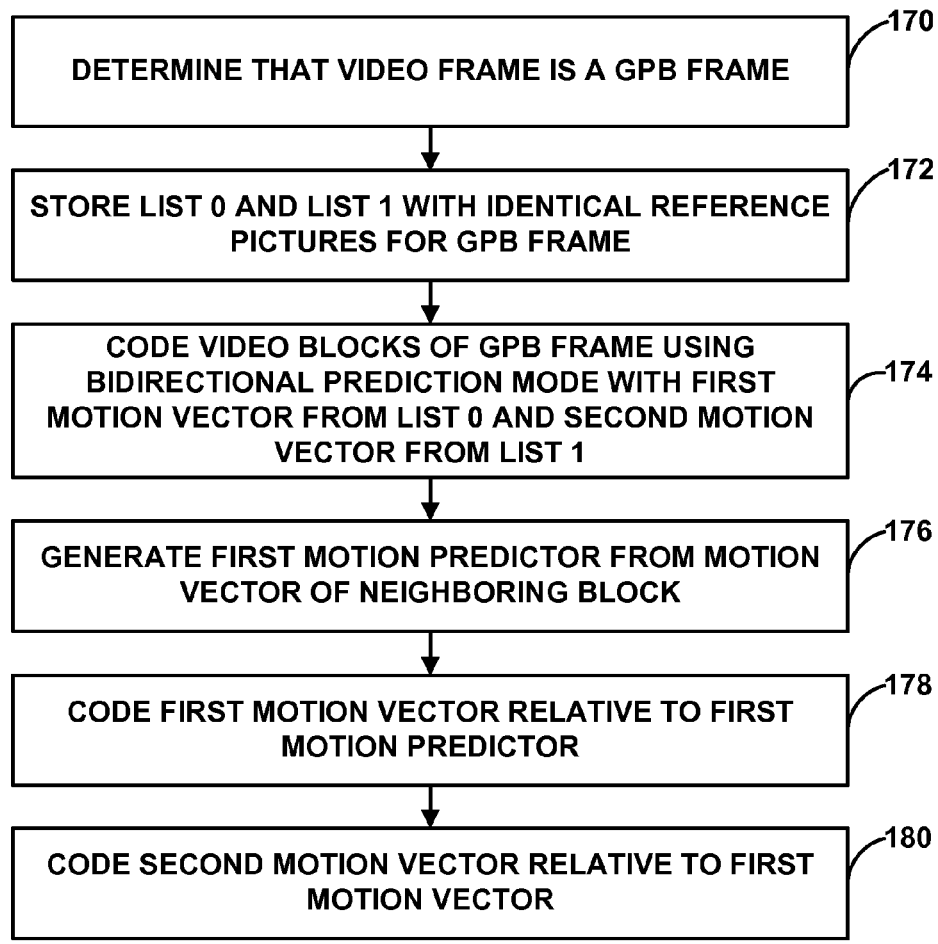
FIG. 9 is a flowchart illustrating an example operation of jointly coding a first motion vector and a second motion vector for a video block of a GPB frame encoded using a bidirectional prediction mode.

FIG. 9 is a flowchart illustrating an example operation of jointly coding a first motion vector and a second motion vector for a video block of a GPB frame encoded using bidirectional prediction. The illustrated operation is described with reference to both video encoder 20 from FIG. 3 and video decoder 30 from FIG. 4.

First, the operation of jointly encoding the motion vectors will be described with reference to video encoder 20 from FIG. 3. Video encoder 20 receives CUs or video blocks of a video frame to be encoded. Video encoder 20 then determines that a current video frame is a GPB frame (170). In some cases, motion estimation unit 42 of video encoder 20 may be configured to determine the inter-prediction mode for a video frame according to a predetermined pattern for a video sequence. The predetermined pattern may designate one or more video frames in the sequence as GPB frames. In other cases, motion estimation unit 42 may determine whether to encode originally designated P frames as GPB frames. The latter case may depend on whether the GPB frame is fully or partially enabled.

When the current video frame is determined to be encoded as a GPB frame, video encoder 20 stores a first reference picture list (list 0) 66 and a second reference picture list (list 1) 68 for the GPB frame that contain identifiers for identical reference pictures in a memory (172). In the case of bidirectional prediction, motion estimation unit 42 of video encoder 20 calculates a first motion vector from list 0 66 and a second motion vector from list 1 68 for each of one or more video blocks of the GPB frame. Video encoder 20 then encodes the one or more video blocks of the GPB frame using bidirectional prediction with the first motion vector from list 0 66 and the second motion vector from list 1 68 (174).

According to the techniques of this disclosure, motion compensation unit 44 may reduce bits used to signal motion vector information for each of the video blocks encoded using bidirectional prediction. Since list 0 66 and list 1 68 include identical reference pictures, the first and second motion vectors are calculated from either the same reference picture or substantially similar reference pictures. The first and second motion vectors for a video block of a GPB frame are, therefore, highly correlated and it is more efficient to jointly encode the two motion vectors.

Motion compensation unit 44 generates a first motion predictor for the first motion vector of the current video block from a motion vector of a neighboring video block from list 0 66 (176). Video encoder 20 encodes the first motion vector for the video block relative to the first motion predictor (178). The first motion vector may be encoded conventionally as a first syntax element defined to indicate a difference between the first motion vector and the first motion predictor, and a second syntax element defined to indicate an index in list 0 66 of a reference picture from which the first motion predictor is generated.

Video encoder 20 then encodes the second motion vector for the video block relative to the first motion vector (180). Motion compensation unit 44 may reduce or eliminate the syntax elements conventionally used to represent the second motion vector. In this way, the second motion vector may be encoded as the difference between the first motion vector and the second motion vector. Video encoder 20 signals the jointly coded motion vectors along with other prediction syntax for each video block of the GPB frame to the video decoder at the block or PU level.

Second, the operation of jointly decoding the motion vectors will be described. Video decoder 30 receives a bitstream including an encoded video frame and syntax elements that represent coding information from a corresponding video encoder, such as video encoder 20. Video decoder 30 may receive syntax elements at the video block or PU level, the video slice level, the video frame level and/or the video sequence level. Entropy decoding unit 80 of video decoder 30 entropy decodes the bitstream to generate quantized coefficients, motion vectors, and other prediction syntax. Entropy decoding unit 80 forwards the motion vectors and other prediction syntax to motion compensation unit 82 of prediction unit 81.

Motion compensation unit 82 then determines that the current video frame is a GPB frame (170). In some cases, motion compensation unit 82 may determine that a given frame is a GPB frame based on an explicitly signaled GPB frame flag received in the syntax at either the video slice level, the video frame level, or the video sequence level. In other cases, motion compensation unit 82 may determine that a given frame is a GPB frame when the first and second reference picture lists received in the syntax at the video frame level contain identical reference pictures. In additional cases, motion compensation unit 82 may determine that a given frame is a GPB frame based on a new frame or slice type defined for the GPB frame.

Video decoder 30 stores the first reference picture list (list 0) 94 and the second reference picture list (list 1) 96 that contain identifiers for identical reference pictures, as indicated in the syntax at the video frame level, in a memory (172). In the case of bidirectional prediction, video decoder 30 decodes one or more video blocks of the GPB frame using bidirectional prediction with a first motion vector from list 0 94 and a second motion vector from list 1 96 (174).

According to the techniques of this disclosure, video decoder 30 jointly decodes the first and second motion vectors used to decode the video blocks of the GPB frame based on the syntax elements received at the video block or PU level. The first motion vector may be decoded conventionally based on a first syntax element that indicates a difference between the first motion vector and a first motion predictor, and a second syntax element that indicates an index in list 0 94 of a reference picture from which the first motion predictor is generated. Motion compensation unit 82 generates the first motion predictor for the first motion vector of the current video block from a motion vector of a neighboring video block identified by the second syntax element (176). Video decoder 30 decodes the first motion vector for the video block relative to the first motion predictor based on the first syntax element (178).

Video decoder 30 then decodes the second motion vector for the video block relative to the first motion vector (180). Motion compensation unit 82 may reduce or eliminate the syntax elements conventionally used to decode the second motion vector. In this way, the second motion vector may be decoded based on the difference between the first motion vector and the second motion vector.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data comprising:
    storing a first reference picture list and a second reference picture list, wherein the first and second reference picture lists include identifiers for identical reference pictures;
    coding a video block of a video frame designated as a generalized P/B (GPB) frame using bidirectional prediction with a first motion vector from a first reference picture in the first reference picture list and a second motion vector from a second reference picture in the second reference picture list;
    predicting the first motion vector for the video block based on a first motion predictor generated from a third motion vector of a neighboring video block, wherein the third motion vector points to the first reference picture in the first reference picture list and is stored for both the first reference picture list and the second reference picture list, and wherein the first motion predictor is generated from the third motion vector and the first reference picture in any of the first reference picture list and the second reference picture list;
    predicting the second motion vector for the video block based on the first motion vector for the video block; and
    jointly coding the first motion vector and the second motion vector for the video block, wherein jointly coding the first motion vector and the second motion vector comprises:
        coding the first motion vector for the video block, wherein coding the first motion vector comprises coding a first syntax element indicating a difference between the first motion vector and the first motion predictor, and coding a second syntax element indicating an index identifying the first reference picture from which the first motion predictor is generated, and
        coding the second motion vector for the video block, wherein coding the second motion vector comprises coding a third syntax element indicating a difference between the second motion vector for the video block and the first motion vector for the video block.

2. The method of claim 1, wherein jointly coding the first motion vector and the second motion vector comprises jointly coding the first and second motion vectors when the first and second motion vectors point to the same reference picture.

3. The method of claim 1, wherein jointly coding the first motion vector and the second motion vector comprises jointly coding the first and second motion vectors when the first and second motion vectors point to substantially similar reference pictures.

4. The method of claim 1, further comprising:
    generating the first motion predictor for the first motion vector from one or more candidate motion vectors of neighboring video blocks; and
    generating a second motion predictor for the second motion vector from one or more candidate motion vectors that include the first motion vector.

5. The method of claim 1, further comprising, when the first and second motion vectors point to different reference pictures, scaling the first motion vector according to a temporal distance between the first motion vector and the second motion vector before using the first motion vector as a second motion predictor for the second motion vector.

6. The method of claim 1, further comprising generating the first motion predictor from the third motion vector and the first reference picture in the second reference picture list when the third motion vector of the neighboring video block is not available from the first reference picture list.

7. The method of claim 1, further comprising:
    coding the neighboring video block using a unidirectional prediction mode with the third motion vector from the first reference picture in the first reference picture list; and
    storing data for the third motion vector in both the first and second reference picture lists.

8. The method of claim 1, wherein the method of coding video data comprises a method of encoding video data using a video encoder, the method comprising:
    storing the first and second reference picture lists that include identifiers for identical reference pictures;
    encoding the video block of the GPB frame in an encoded bitstream using bidirectional prediction with the first motion vector from the first reference picture in the first reference picture list and the second motion vector from the second reference picture in the second reference picture list;
    predicting the first motion vector for the video block based on the first motion predictor;
    predicting the second motion vector for the video block based on the first motion vector for the video block; and
    jointly encoding the first motion vector and the second motion vector for the video block in the encoded bistream, wherein jointly encoding the first motion vector and the second motion vector comprises:
        encoding the first motion vector for the video block, wherein encoding the first motion vector comprises encoding the first syntax element indicating the difference between the first motion vector and the first motion predictor in the encoded bitstream, and encoding the second syntax element indicating the index identifying the first reference picture from which the first motion predictor is generated in the encoded bitstream, and
        encoding the second motion vector for the video block, wherein encoding the second motion vector comprises encoding the third syntax element indicating the difference between the second motion vector for the video block and the first motion vector for the video block in the encoded bitstream.

9. The method of claim 1, wherein the method of coding video data comprises a method of decoding video data using a video decoder, the method comprising:
    receiving an encoded bitstream;
    storing the first and second reference picture lists that include identifiers for identical reference pictures;
    jointly decoding the first motion vector and the second motion vector for the video block of the GPB frame from the encoded bitstream, wherein jointly decoding the first motion vector and the second motion vector comprises:
        decoding the first motion vector for the video block, wherein decoding the first motion vector comprises decoding the first syntax element indicating the difference between the first motion vector and the first motion predictor from the encoded bitstream, and decoding the second syntax element indicating the index identifying the first reference picture from which the first motion predictor is generated from the encoded bitstream, and decoding the second motion vector for the video block, wherein decoding the second motion vector comprises decoding the third syntax element indicating the difference between the second motion vector for the video block and the first motion vector for the video block from the encoded bitstream;

predicting the first motion vector for the video block based on the first motion predictor and the decoded first and second syntax elements;

predicting the second motion vector for the video block based on the first motion vector for the video block and the decoded third syntax element; and decoding the video block from the encoded bitstream using bidirectional prediction with the predicted first motion vector and the predicted second motion vector.

10. The method of claim 1, further comprising coding a one-bit syntax element indicating whether the video block is coded using one of a unidirectional prediction mode or a bidirectional prediction mode, without indicating one of the first reference picture list or the second reference picture list used for the unidirectional prediction mode.

11. A video coding device comprising:
a memory configured to store a first reference picture list and a second reference picture list, wherein the first and second reference picture lists include identifiers for identical reference pictures; and
a processor in communication with the memory and configured to code a video block of a video frame designated as a generalized P/B (GPB) frame using a bidirectional prediction mode with a first motion vector from a first reference picture in the first reference picture list and a second motion vector from a second reference picture in the second reference picture list, predict the first motion vector for the video block based on a first motion predictor generated from a third motion vector of a neighboring video block, wherein the third motion vector points to the first reference picture in the first reference picture list and is stored for both the first reference picture list and the second reference picture list, and wherein the first motion predictor is generated from the third motion vector and the first reference picture in any of the first reference picture list and the second reference picture list, predict the second motion vector for the video block based on the first motion vector for the video block, and jointly code the first motion vector and the second motion vector for the video block, wherein, to jointly code the first motion vector and the second motion vector, the processor is configured to:
code the first motion vector for the video block, wherein the processor is further configured to code a first syntax element indicating a difference between the first motion vector and the first motion predictor, and code a second syntax element indicating an index identifying the first reference picture from which the first motion predictor is generated, and
code the second motion vector for the video block as a third syntax element indicating a difference between the second motion vector for the video block and the first motion vector for the video block.

12. The video coding device of claim 11, wherein the processor jointly codes the first and second motion vectors when the first and second motion vectors point to the same reference picture.

13. The video coding device of claim 11, wherein the processor jointly codes the first and second motion vectors when the first and second motion vectors point to substantially similar reference pictures.

14. The video coding device of claim 11, wherein the processor:
generates the first motion predictor for the first motion vector from one or more candidate motion vectors of neighboring video blocks; and
generates a second motion predictor for the second motion vector from one or more candidate motion vectors that include the first motion vector.

15. The video coding device of claim 11, wherein, when the first and second motion vectors point to different reference pictures, the processor scales the first motion vector according to a temporal distance between the first motion vector and the second motion vector before using the first motion vector as a second motion predictor for the second motion vector.

16. The video coding device of claim 11, wherein the processor generates the first motion predictor from the third motion vector and the first reference picture in the second reference picture list when the third motion vector of the neighboring video block is not available from the first reference picture list.

17. The video coding device of claim 11, wherein the processor:
codes the neighboring video block using a unidirectional prediction mode with the third motion vector from the first reference picture in the first reference picture list; and
stores data for the third motion vector in both the first and second reference picture lists.

18. The video coding device of claim 11, wherein the video coding device comprises a video encoding device configured to encode video data, the processor of the video encoding device being configured to:
encode the video block of the GPB frame in an encoded bitstream using bidirectional prediction with the first motion vector from the first reference picture in the first reference picture list and the second motion vector from the second reference picture in the second reference picture list;
predict the first motion vector for the video block based on the first motion predictor;
predict the second motion vector for the video block based on the first motion vector for the video block; and
jointly encode the first motion vector and the second motion vector for the video block in the encoded bistream, wherein, to jointly encode the first motion vector and the second motion vector, the processor is configured to:
encode the first motion vector for the video block, wherein the processor is further configured to encode the first syntax element indicating the difference between the first motion vector and the first motion predictor in the encoded bitstream, and encode the second syntax element indicating the index identifying the first reference picture from which the first motion predictor is generated in the encoded bitstream, and
encode the second motion vector for the video block, wherein the processor is further configured to encode the third syntax element indicating the difference between the second motion vector for the video block and the first motion vector for the video block in the encoded bitstream.

19. The video coding device of claim 11, wherein the video coding device comprises a video decoding device configured to decode video data, the processor of the video decoding device being configured to:
- receive an encoded bitstream;
- jointly decode the first motion vector and the second motion vector for the video block of the GPB frame from the encoded bitstream, wherein, to jointly decode the first motion vector and the second motion vector, the processor is configured to:
  - decode the first motion vector for the video block, wherein the processor is further configured to decode the first syntax element indicating the difference between the first motion vector and the first motion predictor from the encoded bitstream, and decode the second syntax element indicating the index identifying the first reference picture from which the first motion predictor is generated from the encoded bitstream, and
  - decode the second motion vector for the video block, wherein the processor is further configured to decode the third syntax element indicating the difference between the second motion vector for the video block and the first motion vector for the video block from the encoded bitstream,
- predict the first motion vector for the video block based on the first motion predictor and the decoded first and second syntax elements;
- predict the second motion vector for the video block based on the first motion vector for the video block and the decoded third syntax element; and
- decode the video block from the encoded bitstream using bidirectional prediction with the predicted first motion vector and the predicted second motion vector.

20. The video coding device of claim 11, wherein the processor is configured to code a one-bit syntax element indicating whether the video block is coded using one of a unidirectional prediction mode or a bidirectional prediction mode, without indicating one of the first reference picture list or the second reference picture list used for the unidirectional prediction mode.

21. A video coding device comprising:
- means for storing a first reference picture list and a second reference picture list, wherein the first and second reference picture lists include identifiers for identical reference pictures;
- means for coding a video block of a video frame designated as a generalized P/B (GPB) frame using a bidirectional prediction mode with a first motion vector from a first reference picture in the first reference picture list and a second motion vector from a second reference picture in the second reference picture list;
- means for predicting the first motion vector for the video block based on a first motion predictor generated from a third motion vector of a neighboring video block, wherein the third motion vector points to the first reference picture in the first reference picture list and is stored for both the first reference picture list and the second reference picture list, and wherein the first motion predictor is generated from the third motion vector and the first reference picture in any of the first reference picture list and the second reference picture list;
- means for predicting the second motion vector for the video block based on the first motion vector for the video block; and
- means for jointly coding the first motion vector and the second motion vector for the video block, wherein the means for jointly coding the first motion vector and the second motion vector comprise:
  - means for coding the first motion vector for the video block, wherein the means for coding the first motion vector further comprise means for coding a first syntax element indicating a difference between the first motion vector and the first motion predictor, and means for coding a second syntax element indicating an index identifying the first reference picture in the first reference picture list from which the first motion predictor is generated, and
  - means for coding the second motion vector for the video block as a third syntax element indicating a difference between the second motion vector for the video block and the first motion vector for the video block.

22. The video coding device of claim 21, wherein the means for jointly coding the first motion vector and the second motion vector comprise means for jointly coding the first and second motion vectors when the first and second motion vectors point to the same reference picture.

23. The video coding device of claim 21, wherein the means for jointly coding the first motion vector and the second motion vector comprise means for jointly coding the first and second motion vectors when the first and second motion vectors point to substantially similar reference pictures.

24. The video coding device of claim 21, further comprising:
- means for generating the first motion predictor for the first motion vector from one or more candidate motion vectors of neighboring video blocks; and
- means for generating a second motion predictor for the second motion vector from one or more candidate motion vectors that include the first motion vector.

25. The video coding device of claim 21, further comprising, when the first and second motion vectors point to different reference pictures, means for scaling the first motion vector according to a temporal distance between the first motion vector and the second motion vector before using the first motion vector as a second motion predictor for the second motion vector.

26. The video coding device of claim 21, further comprising means for generating the first motion predictor from the third motion vector and the first reference picture in the second reference picture list when the third motion vector of the neighboring video block is not available from the first reference picture list.

27. The video coding device of claim 21, further comprising:
- means for coding the neighboring video block using a unidirectional prediction mode with the third motion vector from the first reference picture in the first reference picture list; and
- means for storing data for the third motion vector in both the first and second reference picture lists.

28. A computer-readable storage medium storing instructions for coding video data that, upon execution in a processor, cause the processor to:
- store a first reference picture list and a second reference picture list, wherein the first and second reference picture lists include identifiers for identical reference pictures;
- code a video block of a video frame designated as a generalized P/B (GPB) frame using bidirectional prediction with a first motion vector from a first reference picture in the first reference picture list and a second motion vector from a second reference picture in the second reference picture list;

predict the first motion vector for the video block based on a first motion predictor generated from a third motion vector of a neighboring video block, wherein the third motion vector points to the first reference picture in the first reference picture list and is stored for both the first reference picture list and the second reference picture list, and wherein the first motion predictor is generated from the third motion vector and the first reference picture in any of the first reference picture list and the second reference picture list;

predict the second motion vector for the video block based on the first motion vector for the video block; and jointly code the first motion vector and the second motion vector for the video block, wherein the instructions that cause the processor to jointly code the first motion vector and the second motion vector further cause the processor to:

code the first motion vector for the video block, wherein the instructions further cause the processor to code a first syntax element indicating a difference between the first motion vector and the first motion predictor, and code a second syntax element indicating an index identifying the first reference picture from which the first motion predictor is generated, and code the second motion vector for the video block as a third syntax element indicating a difference between the second motion vector for the video block and the first motion vector for the video block.

29. The computer-readable storage medium of claim 28, wherein the instructions cause the processor to jointly code the first and second motion vectors when the first and second motion vectors point to the same reference picture.

30. The computer-readable storage medium of claim 28, wherein the instruction cause the processor to jointly code the first and second motion vectors when the first and second motion vectors point to substantially similar reference pictures.

31. The computer-readable storage medium of claim 28, further comprising instructions that cause the processor to:

generate the first motion predictor for the first motion vector from one or more candidate motion vectors of neighboring video blocks; and generate a second motion predictor for the second motion vector from one or more candidate motion vectors that include the first motion vector.

32. The computer-readable storage medium of claim 28, further comprising, when the first and second motion vectors point to different reference pictures, instructions that cause the processor to scale the first motion vector according to a temporal distance between the first motion vector and the second motion vector before using the first motion vector as a second motion predictor for the second motion vector.

33. The computer-readable storage medium of claim 28, further comprising instructions that cause the processor to generate the first motion predictor from the third motion vector and the first reference picture in the second reference picture list when the third motion vector of the neighboring video block is not available from the first reference picture list.

34. The computer-readable storage medium of claim 28, further comprising instructions that cause the processor to:

code the neighboring video block using unidirectional prediction with the third motion vector from the first reference picture in the first reference picture list; and store data for the third motion vector in both the first and second reference picture lists.

* * * * *